(12) United States Patent
Masel et al.

(10) Patent No.: US 7,740,974 B2
(45) Date of Patent: Jun. 22, 2010

(54) FORMIC ACID FUEL CELLS AND CATALYSTS

(75) Inventors: Richard I. Masel, Champaign, IL (US); Robert Larsen, Urbana, IL (US); Su Yun Ha, Pullman, WA (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 788 days.

(21) Appl. No.: 10/578,055

(22) PCT Filed: Nov. 5, 2004

(86) PCT No.: PCT/US2004/037109
§ 371 (c)(1),
(2), (4) Date: Jul. 27, 2006

(87) PCT Pub. No.: WO2005/081706
PCT Pub. Date: Sep. 9, 2005

(65) Prior Publication Data
US 2007/0099064 A1    May 3, 2007

Related U.S. Application Data

(60) Provisional application No. 60/519,095, filed on Nov. 12, 2003.

(51) Int. Cl.
*H01M 4/92* (2006.01)
(52) U.S. Cl. ......................................................... 429/40
(58) Field of Classification Search .................. 429/40, 429/30, 44
See application file for complete search history.

(56) References Cited

U.S. PATENT DOCUMENTS

| 3,198,666 A | 8/1965 | Gruneberg et al. |
| 3,297,487 A | 1/1967 | Pomeroy et al. |
| 3,467,554 A | 9/1969 | Forten et al. |

(Continued)

FOREIGN PATENT DOCUMENTS

CN    1425499 A    6/2003

(Continued)

OTHER PUBLICATIONS

Ha et al. "Methanol Conditioning for Improved Performance of Formic Acid Fuel Cells," J Power Source 112 655-59 (2002). See IDS filed Aug. 4, 2004 of U.S. Appl. No. 10/817,361.*

(Continued)

*Primary Examiner*—Patrick Ryan
*Assistant Examiner*—Monique Wills
(74) *Attorney, Agent, or Firm*—Greer, Burns & Crain, Ltd.

(57) ABSTRACT

An exemplary fuel cell of the invention includes a formic acid fuel solution in communication with an anode (12, 134), an oxidizer in communication with a cathode (16, 135) electrically linked to the anode, and an anode catalyst that includes Pd. An exemplary formic acid fuel cell membrane electrode assembly (130) includes a proton-conducting membrane (131) having opposing first (132) and second surfaces (133), a cathode catalyst on the second membrane surface, and an anode catalyst including Pd on the first surface.

39 Claims, 12 Drawing Sheets

U.S. PATENT DOCUMENTS

| | | | |
|---|---|---|---|
| 3,506,494 | A | 4/1970 | Adlhart |
| 3,711,385 | A | 1/1973 | Beer |
| 4,039,409 | A | 8/1977 | LaConti et al. |
| 4,081,409 | A | 3/1978 | McNicol et al. |
| 4,127,468 | A | 11/1978 | Alfenaar et al. |
| 4,431,750 | A | 2/1984 | McGinnis et al. |
| 4,447,506 | A | 5/1984 | Luczak et al. |
| 4,457,823 | A | 7/1984 | LaConti et al. |
| 4,457,986 | A | 7/1984 | Bindra et al. |
| 4,478,917 | A | 10/1984 | Fujita et al. |
| 4,493,878 | A | 1/1985 | Horiba et al. |
| 4,797,380 | A | 1/1989 | Motoo et al. |
| 4,806,515 | A | 2/1989 | Luczak et al. |
| 4,822,699 | A | 4/1989 | Wan et al. |
| 5,004,424 | A | 4/1991 | Larminie |
| 5,024,905 | A | 6/1991 | Itoh et al. |
| 5,041,195 | A | 8/1991 | Taylor et al. |
| 5,096,866 | A | 3/1992 | Itoh et al. |
| 5,133,842 | A | 7/1992 | Taylor et al. |
| 5,183,713 | A | 2/1993 | Kunz |
| 5,208,207 | A | 5/1993 | Stonehart et al. |
| 5,225,391 | A | 7/1993 | Stonehart et al. |
| 5,246,791 | A | 9/1993 | Fisher et al. |
| 5,364,711 | A | 11/1994 | Yamada et al. |
| 5,393,619 | A | 2/1995 | Mayer et al. |
| 5,599,637 | A | 2/1997 | Pecherer et al. |
| 5,599,638 | A | 2/1997 | Surampudi et al. |
| 5,773,162 | A | 6/1998 | Surampudi et al. |
| 5,856,036 | A | 1/1999 | Smotkin et al. |
| 5,885,729 | A | 3/1999 | Marchetti |
| 5,904,740 | A | 5/1999 | Davis et al. |
| 6,007,934 | A | 12/1999 | Auer et al. |
| 6,020,083 | A | 2/2000 | Breault et al. |
| 6,146,782 | A | 11/2000 | Wendt et al. |
| 6,165,635 | A | 12/2000 | Auer et al. |
| 6,248,460 | B1 | 6/2001 | Surampudi et al. |
| 6,284,402 | B1 | 9/2001 | Mallouk et al. |
| 6,326,098 | B1 | 12/2001 | Itoh et al. |
| 6,387,557 | B1 | 5/2002 | Krasij et al. |
| 6,432,284 | B1 | 8/2002 | Narayanan et al. |
| 6,447,941 | B1 | 9/2002 | Tomimatsu et al. |
| 6,458,479 | B1 | 10/2002 | Ren et al. |
| 6,485,851 | B1 | 11/2002 | Narayanan et al. |
| 6,492,052 | B2 | 12/2002 | Ren |
| 6,492,147 | B2 | 12/2002 | Imamura et al. |
| 6,495,278 | B1 | 12/2002 | Schmid et al. |
| 6,498,121 | B1 | 12/2002 | Gorer |
| 6,517,965 | B1 | 2/2003 | Gorer |
| 6,533,827 | B1 | 3/2003 | Cisar et al. |
| 6,649,300 | B2 | 11/2003 | Ito et al. |
| 6,660,680 | B1 | 12/2003 | Hampden-Smith et al. |
| 6,670,301 | B2 | 12/2003 | Adzic et al. |
| 6,686,308 | B2 | 2/2004 | Mao et al. |
| 6,723,678 | B2 | 4/2004 | Gorer |
| 6,770,394 | B2 | 8/2004 | Appleby et al. |
| 6,924,055 | B2 | 8/2005 | Hirsch et al. |
| 7,108,773 | B2 | 9/2006 | Masel et al. |
| 7,132,188 | B2 | 11/2006 | Masel et al. |
| 7,282,282 | B2 | 10/2007 | Masel et al. |
| 7,323,267 | B2 | 1/2008 | Masel et al. |
| 2002/0107140 | A1 | 8/2002 | Hampden-Smith et al. |
| 2002/0197522 | A1* | 12/2002 | Lawrence et al. ............ 429/34 |
| 2003/0170508 | A1 | 9/2003 | Beckmann et al. |
| 2004/0115518 | A1 | 6/2004 | Masel et al. |
| 2006/0292434 | A1* | 12/2006 | Hampden-Smith et al. .... 429/40 |

FOREIGN PATENT DOCUMENTS

| | | |
|---|---|---|
| GB | 1273045 | 5/1972 |
| GB | 1292791 | 10/1972 |
| JP | 01227361 A | 3/1988 |

OTHER PUBLICATIONS

Papageorgopoulos, D. et al.; "CO Tolerance of Pd Rich Platinum Paladium Carbon Supported Electrocatalysts fro PEMFC Applications", *Journal of the Electrochemical Society, in press*, Aug. 2002, pp. 1-22.

Adzic, R. et al.: "Structural Effects in Electrocatalysis", *J. Electroanal. Chem.*, 1983, pp. 79-88.

Avramov-Ivic, M. et al.; "The electrocatalytic properties of the oxides of noble metals in the electrooxidaton of methanol and formic acid", *Electrochimica Acta*, 2001, pp. 3175-3180.

Baldauf, M. et al.; "Formic Acid Oxidation on Ultrathin Pd Films on Au(hkl) and Pt(hkl) Electrodes", *J. Phys. Chem.*, 1996, pp. 11375-11381.

Becerik, I. et al.; "Electro-oxidation of Formic Acid on Highly Dispersed Platinum and Perchlorate Doped Polypyrrole Electrodes", *Journal of The Electrochemical Society*, 2001, pp. D49-D54.

Capon, A. et al.; "The Effect of Strong Acid on the Reactions of Hydrogen and Oxygen on the Noble Metals a Study Using Cyclic Voltammetry and a New Teflon Electrode Holder", *Electroanalytical Chemistry and Interfacial Electrochemistry*, 1972, pp. 275-286.

Capon, A. et al.; "The Oxidation of Formic Acid on Noble Metal Electrodes II. A Comparison of the Behaviour of Pure Electrodes", *Electroanalytical Chemistry and Interfacial Electrochemistry*, 1973, pp. 239-254.

Capon, A. et al.; "The Oxidation of Formic Acid on Noble Metal Electrodes III. Intermediates and Mechanism on Platinum Electrodes", *Electroanalytical Chemistry and Interfacial Electrochemistry*, 1973, pp. 205-231.

Capon, A. et al.; "The Oxidation of Formic Acid on Noble Metal Electrodes IV. Platinum and Palladium Electrodes", *Electroanalytical Chemistry and Interfacial Electrochemistry*, 1975, pp. 285-305.

Chi, N. et al.; "Electrocatalytic oxidation of formic acid by Pt/Co nanoparticles", *Catalysis Letters* vol. 71, No. 1-2, 2001, pp. 21-26.

Clavilier, J. et al.; "Heterogeneous electrocatalysis on well defined platinum surfaces modified by controlled amounts of irreversibly absorbed adatoms", Part I: Formic Acid Oxidation on the Pt (III) -Bi system. *J. Electroanal. Chem.*, 1989, pp. 89-100.

Climent, V. et al.; "Electrocatalysis of formic acid and CO oxidation on antimony-modified Pt(111) electrodes", *Electrochimica Chemistry*, 1993, pp. 1403-1414.

El-Shafei, A. et al.; "Electrocatalytic oxidation of formic acid on Pt binary and ternary electrodes in $H_3PO_4$", *Journal of Electroanalytical Chemistry*, 1993, pp. 159-165.

El-Shafei, A.; "Study of nickel upd at a polycrystalline Pt electrode and its influence on HCOOH oxidation in acidic and nearly neutral media", *Journal of electroanalytical Chemistry*, 1998, pp. 81-89.

Fernandez-Vega, A. et al.; "Heterogeneous electrocatalysis on well defined platinum surfaces modified by controlled amounts of irreversibly absorbed adatoms", Part II: Formic Acid Oxidation on the Pt (100) Sb system. *J. Electroanal. Chem.*, 1989, pp. 101-113.

Gonzalez, M.J. et al.; "Electrocatalytic Oxidation of Small Carbohydrate Fuels at Pt-Sn Modified Electrodes", *J. Phys. Chem.* 1998, pp. 9881-9890.

Ha, S. et al.; "A miniature air breathing direct formic acid fuel cell", *Journal of Power Sources*, 2004, pp. 119-124.

Ha, S. et al.; "Methanol conditioning for improved performance of formic acid fuel cells", *Journal of Power Sources*, 2002, pp. 655-659.

Harmsen, J. et al.; "Kinetic modeling for wet air oxidation of formic acid on a carbon supported platinum catalyst", *Applied Catalysis*, 1997, pp. 499-509.

Hartung, T. et al.; "Catalytic Effects of Hg an Ti Submonolayers on the Electrooxidation of Formic Acid on Pt", *J. Electroanal. Chem.*, 1986, pp. 135-149.

Herrero, E. et al.; "Oxidation of formic acid on Pt(111) electrodes modified by irreversibly absorbed tellurium", *Journal of Electroanalytical Chemistry*, 1995, pp. 161-167.

Herrero, E. et al.; "Oxidation of formic acid on Pt(100) electrodes modified by irreversibly absorbed tellurium", *Journal of Electroanalytical Chemistry*, 1995, pp. 145-154.

Jiang, J. et al.; "Nanostructured platinum as an electrocatalyst for the electrooxidation of formic acid", *Journal of Electroanalytical Chemistry*, 2002, pp. 64-70.

Beden, B. et al.; "Electrocatalytic Activity of Noble Metals for the Oxidation of Formate in Neutral Medium", *J. Electroanal. Chem.*, 1979, pp. 127-131.

Llorca, M. et al.; "Formic acid oxidation on $Pd_{ad}$ +Pt(100) and $Pd_{ad}$ +Pt(111) electrodes", *Journal of Electroanalytical Chemistry*, 1994, pp. 151-160.

Llorca, M. et al.; "Formic acid oxidation on Pt(111) electrodes modified by irreversibly absorbed selenium", *Journal of electroanalytical Chemistry*, 1994, pp. 217-225.

McGovern, M. et al.; "Effects of Nafion as a binding agent for unsupported nanoparticle catalysts", *Journal of Power Sources*, 2003, pp. 35-39.

Shen, P. et al.; "Performance of CO-electrodeposited Pt-Ru/$WO_3$ electrodes for the electrooxidation of formic acid at room temperature", *Journal of Electroanalytical Chemistry*, 1995, pp. 223-225.

Waszczuk, P. et al.; "A nanoparticle catalyst with superior activity for electrooxidation of formic acid", *Electrochemistry Communications*, 2002, pp. 599-603.

Rhee, Y. et al.; "Crossover of formic acid through Nafion® membranes", *Journal of Power Sources*, 2003, pp. 35-38.

Pron'kin, S. et al.; "Nanoparticle of Pt hydrosol immobilized on Au support: an approach to the study of structural effects in electrocatalysis", *Electrochimica Acta*, 2001, pp. 2343-2351.

Rice, C. et al.; "Catalysts for direct formic acid fuel cells", *Journal of Power Sources*, 2003, pp. 229-235.

Rice, C. et al.; "Direct formic acid fuel cells", *Journal of Power Sources*, 2002, pp. 83-89.

Gasteiger', H. et al.; "Electro-Oxidation of Small Organic Molecules on Well-Characterized Pt-Ru Alloys", *Electrochimica Acta*, vol. 39, No. 11/12, 1994, pp. 1825-1832.

Smith, S. et al.; "Structural effects on the oxidation of HCOOH by bismuth modified Pt(111) electrodes with (110) manatomic steps", *Journal of Electroanalytical Chemistry*, 1999, pp. 43-49.

Shibata, M. et al.; "Electrocatalysis by Ad-Atoms", Part XXII: $S_{hole}$ Control by Ad-Atoms on HCOOH Oxidation. *J. Electroanal Chem.*, 1988, pp. 253-264.

Chen, M. et al.; "Enhancement of the electrochemical oxidation of formic acid. Effects of anion absorption and variation of rotation rate", *Electrochimica Acta*, 2001, pp. 3481-3492.

Beltowska-Brzezinska M. et al.; "The Influence of Upd-Lead on the Absorption of Formaldehyde, Formic Acid and Methanol on Pt In Acid Solution", *Electrochimica Acta*, vol. 30, No. 11, 1985, pp. 1465-1471.

Xia, X.; "New insights into the influence of upd Sn on the oxidation of formic acid on platinum in acidic solution", *Electrochimica Acta*, 1999, pp. 1057-1066.

Xiang, J. et al.; "Investigation of the mechanism of the electrochemical oxidation of formic acid at a gold electrode in sulfuric acid solution", *Journal of Electroanalytical Chemistry*, 2001, pp. 95-100.

Yang, Y. et al.; "Surface modification and electrocatalytic properties of Pt(100), Pt(110), Pt(320) an Pt(331) electrodes with Sb towards HCOOH oxidation", *Electrochimica Acta*, 2001, pp. 4339-4348.

Sobkowski, J. et al.; "The Behaviour of Formic Acid on a Rhodium Electrode", *J. Electroanal. Chem.*, 1978, pp. 309-320.

Zhang, X. et al.; "Electrocatalytic Oxidation of Formic Acid on Ultrafine Palladium Particles Supported on a Glassy Carbon", *Electrochimica Acta*, vol. 40, No. 12, 1995, pp. 1889-1897.

M. Watanabe, "Electrocatalysis by Ad-Atoms, Part XIII. Preparation of Ad-Electrodes with Tin Ad-Atoms for Methanol Formaldehyde and Formic Acid Fuel Cells", J. Electroanal. Chem. 191, Dec. 1985, p. 367-375.

M. Watanabe, "Electrocatalysis by Ad-Atoms, Part XXIII. Design of Platinum Ad-Electrodes for Formic Acid Fuel Cells with Ad-Atoms of the IVth and the Vth Groups," J. Electroanal. Chem. 250, Feb. 1988, p. 117-125.

Zhu, Y. et al.; "High power density direct formic acid fuel cells", *Journal of Power Sources*, 2004, pp. 8-14.

A. Wieckowski and R. I. Masel, "UHV and electrochemical studies of CO and methanol adsorbed at platinum/ruthenium surfaces, and reference to fuel cell catalysis," Electrochimica Acta 47, 22-23, 3637-3652 (2002).

N. Markovic, H. Gasteiger, P. Ross, X. Jiang, I. Villegas and M. Weaver, "Electro-oxidation mechanisms of methanol and formic acid on Pt-Ru alloy surfaces," Electrochimica Acta, 40, 91-98, (1995).

M. Arenz, V. Stamenkovic, T. J. Schmidt, K. Wandelt, P. N. Ross and N. M. Markovic, "The electro-oxidation of formic acid on Pt Pd single crystal bimetallic surfaces," Physical Chemistry Chemical Physics, 5, 4242, (2003).

N. Watanabe, K. Iwatsu, A. Yamakata, T. Ohtani, J. Kubota, J. N. Kondo, A. Wada, K. Domen and C. Hirose, "SFG study of formic acid on a Pt(110)-(1×2) surface," Surf. Sci., 651, 357-358, (1996).

S. W. Jorgensen and R. J. Madix,, "Active oxygen on Group VIII metals: activation of formic acid and formaldehyde on Pd(100)," J. Am. Chem. Soc., 110, 397, (1988).

F. Solymosi and I. Kovacs, "Adsorption and reaction of HCOOH on K-promoted Pd(100) surfaces," Surf. Sci., 259, 95, (1991).

C. Xu and D. W. Goodman, "Adsorption and Reaction of Formic Acid on a Pseudomorphic Palladium Monolayer on Mo(110)," J. Phys. Chem., 100, 245, (1996).

R. R. Adzic, A.V. Tripkovic and N. M. Markovic, "Structural Effects in Electrocatalysis, Oxidation of Formic Acid and Oxygen Reduction on Single-Crystal Electrodes and the effects of Foreign Metal Adatoms," Electroanal. Chem., 150 79-88, (1983).

Guo-Qiang Lu, Alechia Crown, and Andrzej Wieckowski, "Formic Acid Decomposition on Polycrystalline Platinum and Palladized Platinum Electrodes," J. Phys. Chem. B 1999, 103, pp. 9700-9711.

Weber, M.; Wang, J.T.; Wasmus, S; Savinell, R.F.; "Formic Acid Oxidation in a Polymer Electrolyte Fuel Cell: A Real-Time Mass-Spectrometry Study," J. Electochem. Soc., 1996, 143(7), L158-1160.

P. Waszczuk, J. Solla-Gullón, H.S. Kim, Y.Y. Tong, V. Montiel, A. Aldaz, and A. Wieckowski, "Methanol Electrooxidation on Platinum/Ruthenium Nanoparticle Catalysts," Journal of Catalysis 203, pp. 1-6 (2001).

Gdowski, G.E.; Fai, J.A.; Maxid, R.J.; Reactive Scattering of Small Molecules from Platinum Crystal Surfaces: $D_2CO$, $CH_3$, $CH_3OH$, HCOOH and the Nonanomalous Kinetics of Hydrogen Atom Recombination, Surf. Sci., 1983, 127(3) 541-54.

\* cited by examiner

FORMIC ACID FUEL CELLS AND CATALYSTS

CROSS REFERENCE

The present invention claims priority on U.S. application Ser. No. 10/407,385 filed on Apr. 4, 2003, now U.S. Pat. No. 7,132,188; on U.S. Provisional application no. 60/519,095 filed Nov. 12, 2003; on U.S. application Ser. No. 10/664,772 filed on Sep. 17, 2003, now U.S. Pat. No. 7,282,282; and on U.S. application Ser. No. 10/817,361 filed Apr. 2, 2004; each of which are incorporated herein by reference.

STATEMENT OF GOVERNMENT INTEREST

This invention was made with Government assistance under Department of Energy Grant No. DEGF-02-99ER14993, and DARPA Air Force Contract No. F33615-01-C-2172. The Government has certain rights in the invention.

TECHNICAL FIELD

The invention generally relates to formic acid fuel cells, catalysts for formic acid fuel cells, methods for making formic acid fuel cell catalysts, and formic acid fuel cell membrane electrode assemblies.

BACKGROUND ART

Fuel cells are electrochemical cells in which a free energy change resulting from a fuel oxidation reaction is converted into electrical energy. Applications for fuel cells include battery replacement, mini and microelectronics, car engines, power plants, and many others. One advantage of fuel cells is that they are substantially pollution-free.

In hydrogen fuel cells, hydrogen gas is oxidized to form water, with a useful electrical current produced as a byproduct of the oxidation reaction. A solid polymer membrane electrolyte layer may be used to separate the hydrogen fuel from the oxygen. The anode and cathode are arranged on opposite faces of the membrane. Electron flow between the anode and cathode layers of the membrane electrode assembly may be exploited to provide electrical power. Hydrogen fuel cells are impractical for many applications, however, because of difficulties related to storing and handling hydrogen gas.

Organic fuel cells may prove useful in many applications as an alternative to hydrogen fuel cells. In an organic fuel cell, an organic fuel such as methanol is oxidized to carbon dioxide at an anode, while air or oxygen is simultaneously reduced to water at a cathode. One advantage over hydrogen fuel cells is that organic/air fuel cells may be operated with a liquid organic fuel. This eliminates problems associated with hydrogen gas handling and storage. Some organic fuel cells require initial conversion of the organic fuel to hydrogen gas by a reformer. These are referred to as "indirect" fuel cells. The need for a reformer increases cell size, cost, complexity, and start up time. Other types of organic fuel cells, called "direct," eliminate these disadvantages by directly oxidizing the organic fuel without conversion to hydrogen gas. Further classification of fuel cells may distinguish "passive" cells from "active" cells. In an active cell, fuel solution is continuously supplied for contact with the anode (as by pumping, for example), whereas in a "passive" cell a specified quantity of fuel solution is provided for reaction.

Fuel cells including methanol, formic acid, and other organic fuel cells make use of an anode catalyst and a cathode catalyst to promote efficiency. The catalysts promote the reduction reaction at the cathode and the oxidation at the anode. Some prior efforts have focused on platinum (Pt) based catalysts, with platinum/ruthenium or platinum/palladium anode catalysts being two examples. When used in an organic fuel cell, known anode catalysts, including Pt based catalysts, have only a low level of activity as compared to those in a hydrogen fuel cell. As a result, organic cells tend to require relatively large loadings of the catalyst. This adds considerable cost to the fuel cells due to the high price of the precious and semi-precious metals in the catalysts.

DISCLOSURE OF THE INVENTION

An exemplary fuel cell of the invention includes a formic acid fuel solution in communication with an anode, an oxidizer in communication with a cathode electrically linked to the anode, and an anode catalyst that includes Pd. An exemplary formic acid fuel cell membrane electrode assembly includes a proton-conducting membrane having opposing first and second surfaces, a cathode catalyst on the second membrane surface, and an anode catalyst including Pd on the first surface.

DETAILED DESCRIPTION

Before describing exemplary embodiments of the invention in detail, it will be appreciated that the present invention includes formic acid fuel cells and formic acid fuel cell catalysts, and that artisans will appreciate many broad inventive aspects from reference to the preferred embodiments. It will be further appreciated that in describing one exemplary embodiment of the invention, description of another may also be made. For example, description of a catalyst may likewise comprise description of a fuel cell when use of the catalyst is discussed with reference to a fuel cell. One aspect of the present invention is directed to catalysts for use with formic acid fuel cells. An exemplary fuel cell catalyst of the invention includes Pd and one or more metals chosen from the group of Ti, Zr, Hf, V, Nb, Ta, Cr, Mo, W, or Au. Catalysts of the invention may be useful as an anode or a cathode catalyst$_{[SF1]}$, and may be supported or unsupported. Carbon in particular may be used as a support. Exemplary embodiments of the invention include anode catalysts for formic acid fuel cells. The Pd based catalysts of the invention provide many benefits and advantages, including a cost that can be a factor of three or more less than Pt, and an activity level that in some conditions is more than an order of magnitude greater than Pt based catalysts. In order to describe catalysts of the invention, several exemplary catalysts were prepared and tested.

First Group of Exemplary Catalysts

Ti (Alfa-Aesar 44243), Zr (Alfa-Aesar 10594), Hf (Alfa-Aesar 10793), V (Alfa-Aesar 13783), Nb (Alfa-Aesar 10261), Ta (Alfa-Aesar 14266), Cr (Alfa-Aesar 42310), Mo (Alfa-Aesar 41764), W (Alfa-Aesar 10416) and Au (Alfa-Aesar 14721) foil samples were cleaned by sanding with 200 gr sandpaper, then rinsed with Millipore water. Each foil was attached to a working electrode in a standard two electrode electrochemical cell with a platinum counter electrode. A drop of 0.01 M $PdCl_2$ (Alfa-Aesar 11034) was placed between the working electrode and the counter electrode. Then a −450 mV potential difference was applied between the foil electrode and the counterelectrode. The potential was maintained until 0.6 monolayers of Pd was deposited onto the metal foil. Then the potential was removed and the foil was rinsed in Millipore water.

Figure 1:
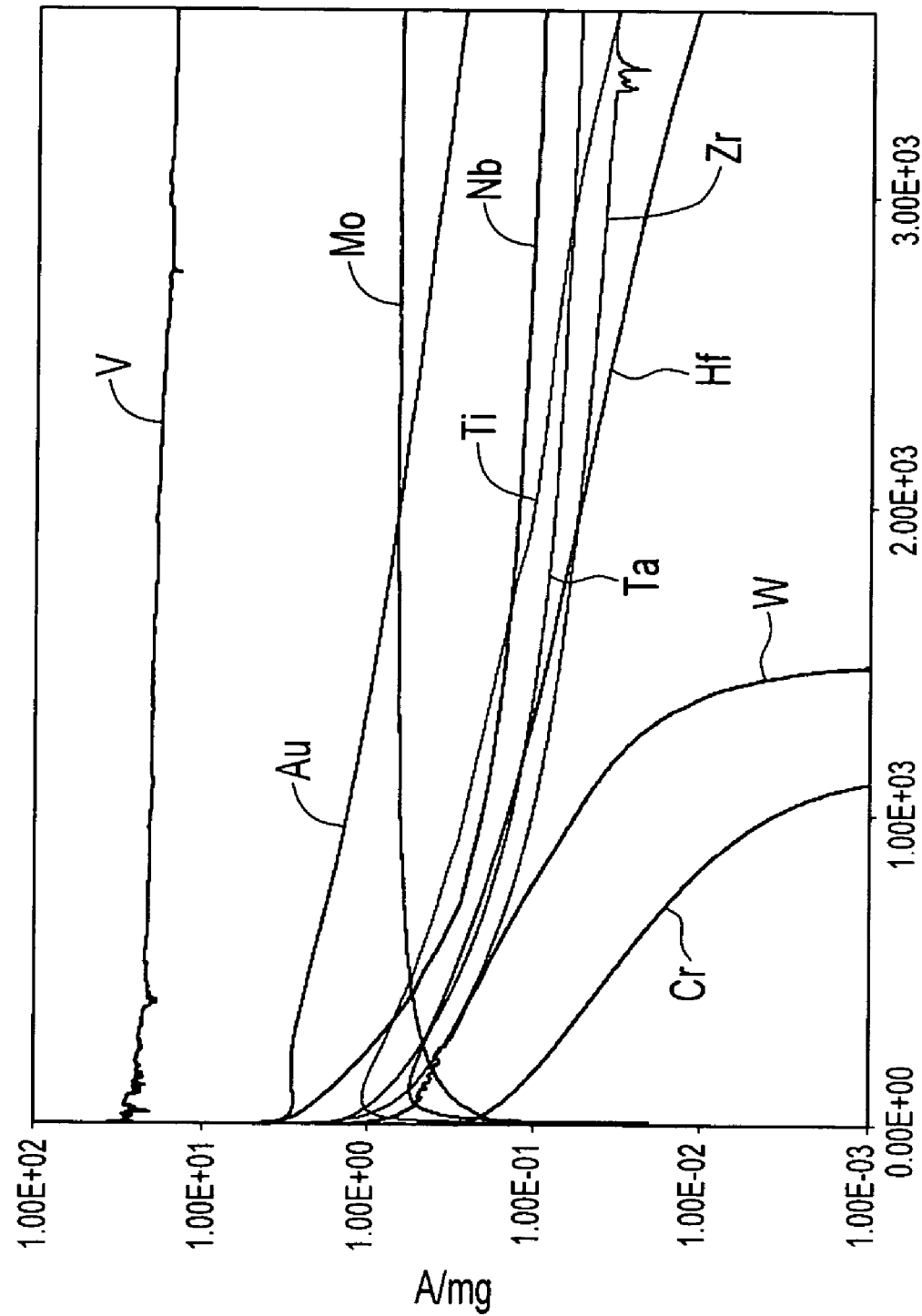
FIG. 1 is a chart illustrating catalytic activity for a number of Pd-M catalysts of the invention for a formic acid reduction reaction, where M=Ti, Zr, Hf, V Nb, Ta, Cr, Mo, W, Au.

The foils were then tested in a standard three-electrode electrochemical cell, with a platinum counter electrode and a silver/silver chloride reference electrode. The foil was attached to the working electrode in the electrochemical cell with no applied potential. A solution containing 5M formic acid and 0.1 M sulfuric acid in Millipore water was loaded into the cell. Then a potential of 0.3 V with respect to a reversible hydrogen electrode was applied to the cell. FIG. 1 shows the current per milligram of palladium that was measured for each of the catalyst formulations. The currents are very high, with V offering the highest measured. Others showing particularly good performance include Au, Mo, Ti, and Mb. The current was also measured as a function of time at 0.3, 0.4, 0.5, and 0.6 V with respect to RHE.

Figure 2:
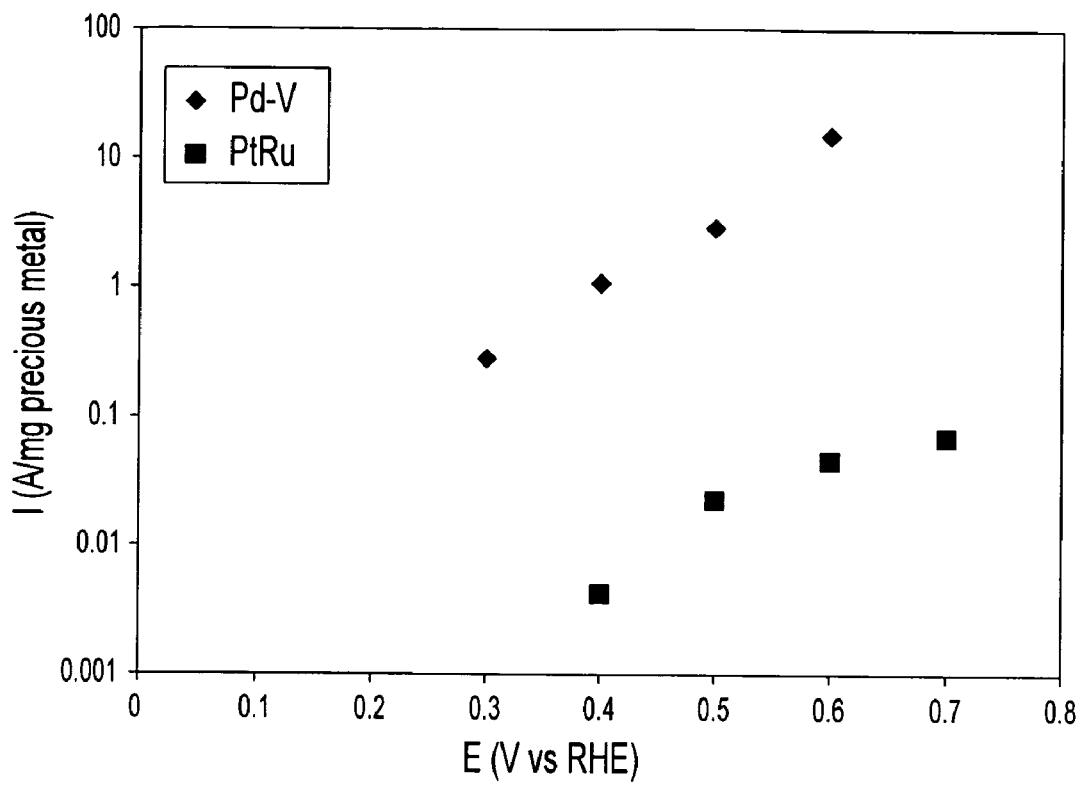
FIG. 2 is Tafel data for an exemplary Pd—V catalyst formulation compared to commercially available PtRu alloy catalyst towards formic acid oxidation.
Figure 3:
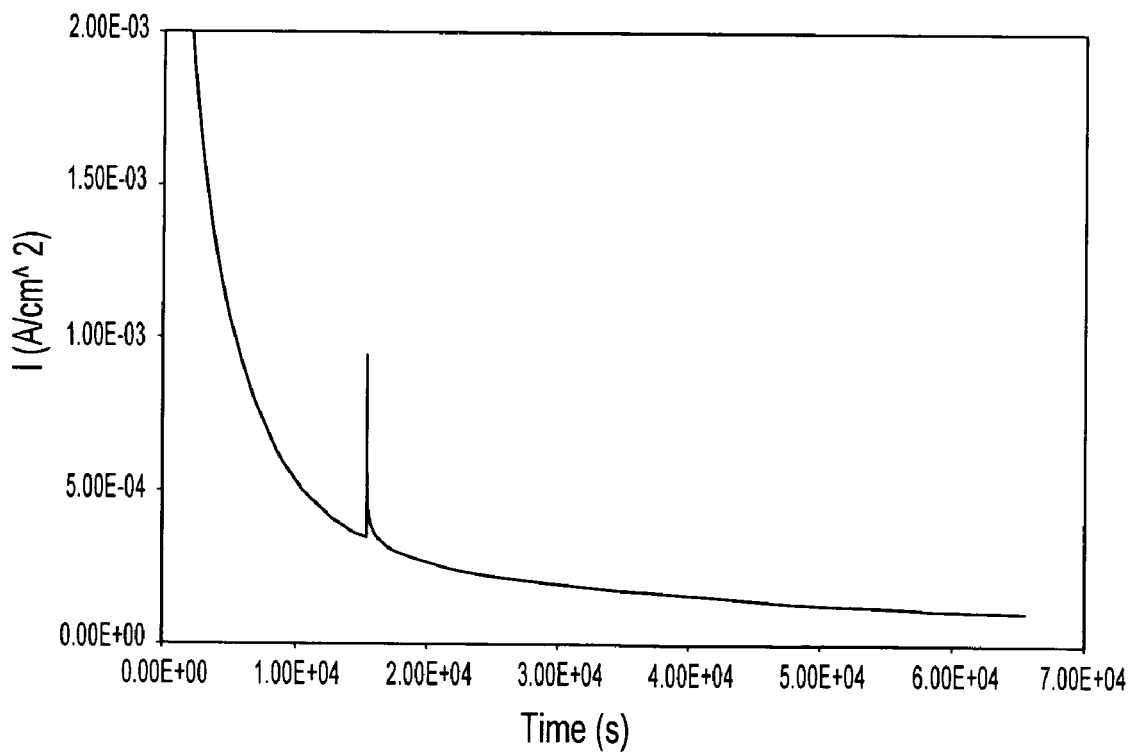
FIG. 3 illustrates chronoamperometric activity of an exemplary Pd—V catalyst towards formic acid oxidation for 20 hours.
Figure 4:
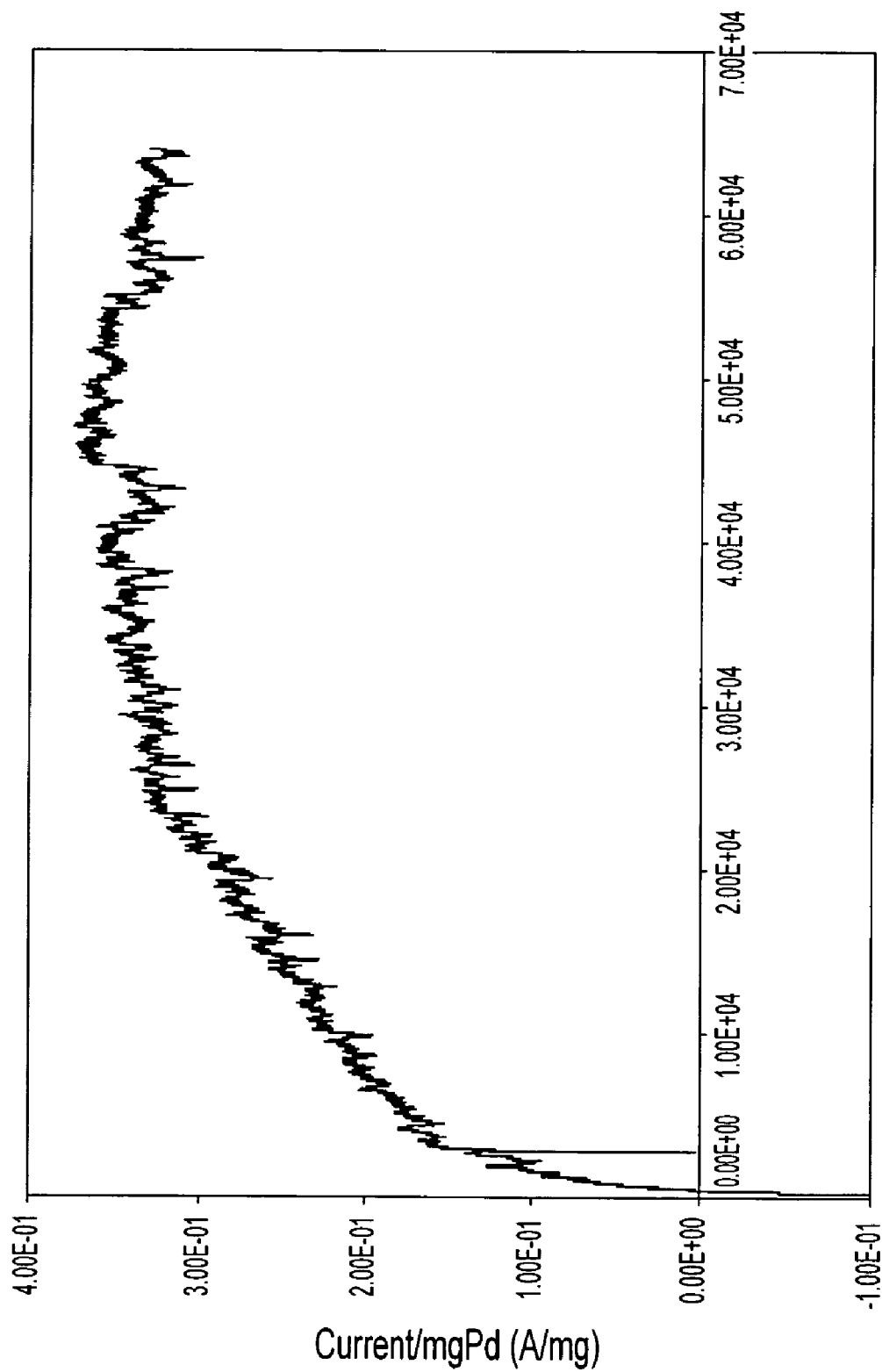
FIG. 4 illustrates chronoamperometric activity of Pd—V towards methanol oxidation for 20 hours.

FIG. 2 shows the current obtained after two hours in these experiments. FIG. 2 also illustrates the current measured with a Johnson Mathey Hispec 6000 Pt/Ru catalyst of the prior art under the same conditions. FIG. 2 shows that the current per mg of precious metal is three orders of magnitude higher with the Pd/V catalyst of the invention than with Pt/Ru catalyst. This is a surprising result that suggests substantial benefits and advantages are achieved through catalysts of the invention. FIG. 2 shows the results of a 20 hr test of the Pd/V catalyst of the invention. It is also noted that the Pd—V catalyst of the invention remains quite active towards the oxidation of formic acid during the 20 hr tests. This also represents a surprising result.

The coverage of the Pd on the V was also observed to effect the activity. Too high of coverage may be economically disadvantageous based on the relative high cost of Pd. Too low of coverage may result in undesirably low levels of current density. Coverage of between about 0.15 and about 0.55 monolayers of Pd on V was discovered to offer useful levels current density and current per mg of Pd, although other levels are contemplated and may be desirable for a particular application. The coverage of Pd on Zr was also observed to effect activity. Coverage of Pd of between about 0.45 and about 1 monolayer of Pd on Zr was found to be useful, although other levels are contemplated and may be desirable for a particular application.

It is noted that Pd catalysts when used with formic acid fuel cells can become poisoned over time and thereby show some decreased activity. It is suspected that OH or other poisoning species may become bound to catalytic sites, thereby making them unavailable for future catalytic activity. It is believed that addition of metals M, with Au, V, And Zr being particular examples, may prevent or reduce the poisoning. Also, it has been discovered that the poisoning effects can be largely reversed and the poisoning species removed through application of high potential. Thus, for example, it may be useful when operating a formic acid fuel cell of the invention with a Pd catalyst to intermittently apply a high potential to "clean" the Pd catalysts of poisoning species.

An exemplary fuel cell of the invention is linked to a capacitor or other charge storage device so that a sufficiently high potential may be applied from time to time to clean the Pd catalyst. A portion of the energy generated by an exemplary fuel cell of the invention may be used to charge the capacitor or other storage device over a period of 30 mins. or so, for example, with the charge from the capacitor then applied to clean the Pd catalyst.

Second Group of Exemplary Catalysts

In order to make another group of exemplary catalysts of the invention, Ti (Alfa-Aesar 44243), Zr (Alfa-Aesar 10594), Hf (Alfa-Aesar 10793), V (Alfa-Aesar 13783), Nb (Alfa-Aesar 10261), Ta (Alfa-Aesar 14266), Cr (Alfa-Aesar 42310), Mo (Alfa-Aesar 41764), W (Alfa-Aesar 10416) and Au (Alfa-Aesar 14721) foil samples were cleaned by sanding with 200 gr sandpaper, then rinsed with Millipore water. Each foil was then placed in a 0.01 M $PdCl_2$ solution for about 1 minute and then rinsed with Millipore water. Each foil was then attached to a working electrode in a standard two electrode electrochemical cell with a platinum counter electrode. A drop of 0.1 M $H_2SO_4$ was placed between the working electrode and the counter electrode. Then a −450 mV potential difference was applied between the foil electrode and the counterelectrode for about 30 seconds. Then the potential was removed and the foil was rinsed in Millipore water. Exemplary catalysts of the invention resulted.

Third Exemplary Catalyst

PdV is an exemplary catalyst of the invention that is believed to show useful benefits and advantages when used as an anode catalyst for a formic acid fuel cell. In order to further illustrate this exemplary catalyst in addition to a method for making it, it was synthesized and subjected to testing.

Fifty milligrams of V metal powder (Alfa-Aesar 12234) was first cleaned by soaking in 1 M $H_2SO_4$, and then rinsed in Millipore water. The powder was then stirred vigorously in Millipore water while 0.4 mL of 0.01 M $PdCl_2$ in Millipore water was added dropwise to the stirred solution. The active V powder reacted with the $Pd^{2+}$ ion and precipitated the Pd metal onto the V powder surface. Next, a solution of 100 mg Millipore water and 18.2 mg of 5 wt % NAFION solution (Solution Technologies) (NAFION is a registered trademark used with a commercially available copolymer of tetrafluoroethylene and perfluorovinylether sulfonic acid from DuPont Chemical Co., Delaware) were sonicated together with 3 mg of the Pd/V for 10 minutes to formulate an exemplary catalyst suspension. Then about 40 mg of this catalyst suspension was placed on a graphite rod working electrode (6 mm diameter) using a micropippette. The electrode was then dried under a heat lamp for 25 minutes producing a Pd/V catalyst containing about 20 wt % NAFION on the working electrode. The working electrode was then placed in a solution of 5 M formic acid and 0.1 M sulfuric acid in Millipore water and held at a potential of 0.3 V to test for activity. The catalyst was found to be quite active, with performance very similar to that of the Pd/V foil discussed above.

Those knowledgeable in the art will appreciate that catalysts of the invention may benefit through additions of promoters such as Au, Silver (Ag), Selenium (Se), Bismuth (Bi), Ru, Nickel (Ni), Pt, Mo, W, Manganese (Mn). Other catalysts of the present invention include these promoters.

Fourth Group of Exemplary Catalysts

It has been discovered that some catalysts when used with formic acid fuel cells of the invention show surprising levels of catalytic activity. For example, supporting metal catalysts on carbon has been discovered to significantly increase catalytic activity on a per mass basis of the metal. For example, it has been discovered that catalysts containing Pd supported on carbon may achieve benefits and advantages over other catalysts, including unsupported Pd. The Pd may be in the form of nanoparticles supported on the carbon. Another metal may be combined with the Pd, including one or more of Ti, Zr, Hf, V, Nb, Ta, Cr, Mo, or W. Pd combined with one or more of Au, V, and Mo and supported on carbon is believed to provide beneficial levels of activity for formic acid fuel cells, and surprising results are further realized with increasing surface area of the metal on the carbon nanoparticles. The present invention includes these catalysts, in addition to methods for making them. It has also been discovered that some methods of synthesizing the Pd based catalysts produce catalysts of greater activity when used with formic acid fuel cells than do catalysts made through other methods of synthesis.

In order to further describe additional exemplary catalysts of the invention and methods making them, the synthesis of three exemplary carbon supported catalysts of the invention will be described. The three exemplary catalysts are: 20 wt % Pd supported on carbon (C), 20% wt PdAu supported on C, and 40 wt % supported on C. The percentages refer to the weight percent of Pd relative to C. For example, 20 wt % Pd supported on C is 20 wt % Pd and 80 wt % C. In the case of the exemplary PdAu catalyst, Pd was provided in a 50:1 mole ratio to Au, and the PdAu combined to total 20 wt % with the balance being C.

Different weight ratios of Pd to carbon support will be useful and may be selected based on factors including the fuel solution to be catalyzed and others. For exemplary formic acid fuel cells of the invention, it is believed that at least about 5% (wt) Pd based on the total weight of the catalyst (e.g., 5% Pd, 95% carbon) is beneficial. Other weight ratios believed useful are at least about 10% Pd based on the total weight of the catalyst, and at least about 20% Pd based on the total weight of the catalyst. Increasing weight ratios generally show increased activity, but also increase cost. At some weight ratio point increased activity is not justified by the increased cost. Weight ratios of about 20% are believed to be a useful level to show significant catalytic activity while also achieving significant cost savings. Other weight ratios, including below 5% Pd, are contemplated.

Each of the exemplary carbon-supported catalysts was prepared by a metal chloride reduction process. First, carbon (VULCAN XC-72 available from Cabot Corp., Alhparetta Ga.) was conditioned by stirring in 10 M HCl in Millipore water for about 12 hours and then rinsing with Millipore water until the pH of the rinse reached 7. Next, a solution of 8 g/L $PdCl_2$ solution in 5 M HCl and Millipore water was added to a beaker. The amount of solution added depended on the desired wt % of Pd in the catalyst being prepared:

for the 20 wt % Pd on C catalyst and the and 20 wt % Pd Au on C, about 5 mL of solution was added for the 40 wt % Pd on C, about 14 mL of solution was added.

About 1 mL of a 5 g/L polyvinyl alcohol (PVA) in Millipore water solution was also added to the beaker. 100 mg of the conditioned carbon was then added along with enough water to make 1 L total. The solution was then stirred vigorously while 50 mL of freshly prepared 0.05 M $NaBH_4$ in Millipore water was added drop-wise. When this was done, the pH of the solution was raised to about 11 by addition of 5 M NaOH. The solution was then stirred vigorously for 1 hour, after which the catalyst was allowed to settle for an additional 30 minutes. The carbon-supported catalyst was then filtered, rinsed in Millipore water and dried at 80° C. for about 8 hours.

For the exemplary PdAu on C catalyst, a $HAuCl_4$ solution was prepared by dissolving the desired amount of gold powder (Alfa Aesar) to provide a final molar ratio of 50:1 Pd:Au in a minimum amount of aqua regia (3 parts concentrated HCl to 1 part concentrated $HNO_3$ by volume) and removing the $HNO_3$ by heating. This was then added to the solution at the same stage as the $PdCl_2$ addition following the same procedures as above.

Each of the exemplary catalysts was then tested for activity. The catalysts were tested using exemplary fuel cell fuel solutions of the invention. All experiments were performed at room temperature in air using a custom designed three-electrode cell. Electrochemical measurements were taken using a Solartron SI 1287 attached to a computer using CorrWare software. The counter electrode was made from a 25 mm×50 mm piece of 52 mesh platinized platinum gauze (woven from 0.1 mm diameter wire, 99.9%, Alfa Aesar) attached to a platinum wire (0.6 mm diameter, 12 cm long, 99.95%, Alfa Aesar). The reference electrode was Ag/AgCl in 3.0 M NaCl (BASF, MF-2052). For convenience, results are reported versus the reversible hydrogen electrode (RHE). Two additional exemplary Pd catalysts of the invention were likewise subjected to testing, both of which were unsupported. One Pd catalyst was high surface area Pd commercially available from Aldrich Chemical Co. ("Aldrich Pd black"), and the other was a low surface area Pd from Alfa-Aesar Chemical ("Alfa Pd black").

All five catalysts were attached to a graphite working electrode for testing in the electrochemical cell. First, 5 mg/mL suspensions of each of the catalysts in Millipore water were made. Then enough of a 5 wt % NAFION solution was added to give a 20 wt % NAFION in the catalyst layer when dried. Each catalyst was sonicated for 10 minutes. Next, 50 μL of the suspension was placed on the graphite working electrode using a micropipette and dried under a heat lamp for about 25 minutes. After drying, the electrode was allowed to cool for about 10 min and then rinsed with Millipore water. All working electrodes were stable, and no catalyst particles were observed to detach during the experiments.

Figure 5A:
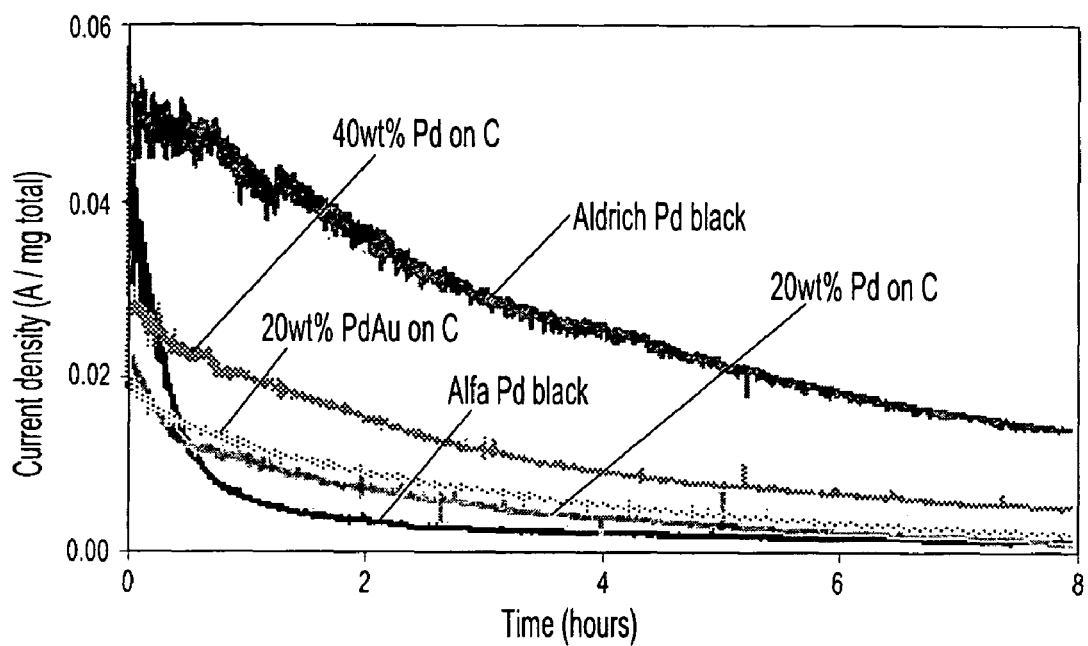
FIG. 5(A) illustrates chronoamperometric activity of exemplary Pd catalysts used in exemplary formic acid fuel cells of the invention.
Figure 5B:
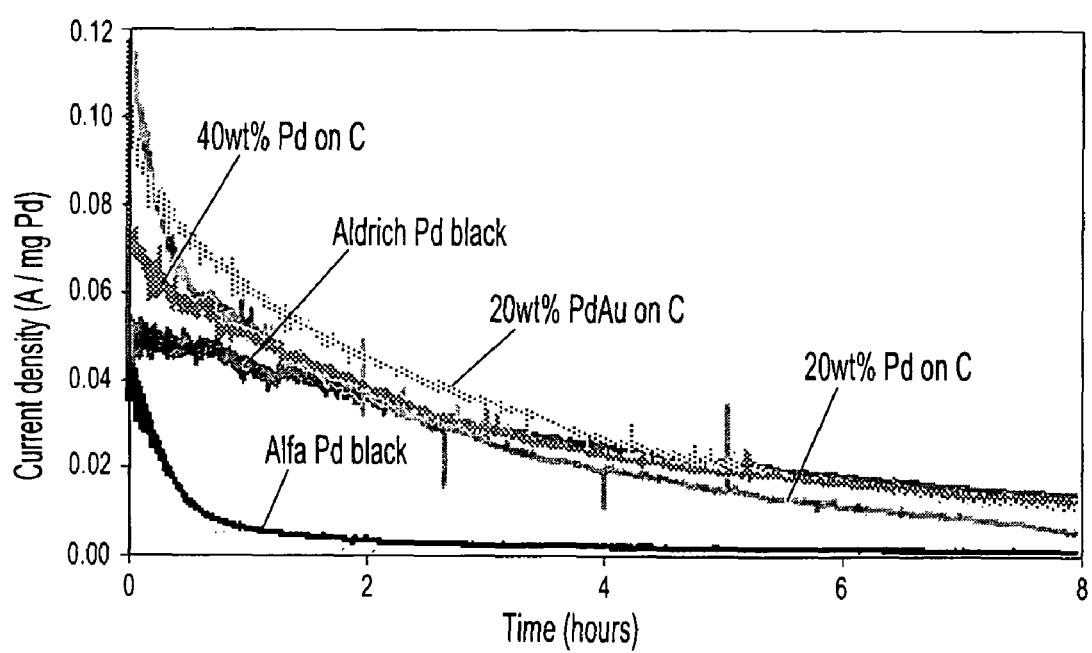
FIG. 5(B) represents the data of FIG. 5(A) normalized on a per unit Pd weight basis.

Catalyst samples were tested in the custom three electrode cell by contact of the working electrode with the interface of a 5 M HCOOH/0.1 M $H_2SO_4$ solution contained within the cell. Chronoamperometry was then performed by holding the working electrode at 0.3 V vs. the reversible hydrogen electrode (RHE) while measuring the current over time. FIG. 5(A) shows the chronoamperometric measurements at 0.3 V vs. RHE for each of the five catalysts regardless of total catalyst weight, while FIG. 5(B) shows activity on a per weight Pd basis. By both measures, the low surface area Pd black from Alfa has the lowest performance and deactivates in the first 2 hours. The high surface area Aldrich Pd black shows much better performance and deactivates more slowly. FIG. 5(A) demonstrates that the high surface area Aldrich Pd black shows the highest overall activity, followed by 40 wt % Pd on carbon, then 20 wt % PdAu on carbon, 20 wt % Pd on carbon and finally by the low surface area Pd black.

The results of FIG. 5(A), however, do not take into account the amount of Pd present in the catalyst. Since this is the predominant cost factor, it can be significant. FIG. 5(B) reports the same data as FIG. 5(A), except that the results are based on Pd content. FIG. 5(B) illustrates that the deactivation of the Alfa Pd black is substantially greater than the other Pd catalysts. The carbon supported catalysts of the invention show higher current densities than the Aldrich Pd black initially. However, the Aldrich Pd black deactivates more slowly, and accordingly outperforms the carbon-supported catalysts at longer times. The 40 wt % Pd on carbon has a lower initial current density than the two 20 wt % Pd catalysts and deactivates more slowly. FIGS. 5(A) and 5(B) show that the addition of a small amount of Au to the C supported Pd catalyst enhances its performance.

It is believed that similar benefits and advantages will be achieved when one or more metals from the group of Ti, Zr, Hf, V, Nb, Ta, Cr, Mo, or W are combined with Pd and supported on C. Metals M in combination with Pd may add to the overall catalytic activity, may increase corrosion resistance, may reduce poisoning effects, and may have other benefits. V and Mo, in particular, are believed to provide beneficial levels of activity for formic acid fuel cells when combined with Pd and supported on C. Au may be a preferred metal in some applications because of its relatively high corrosion resistance. Catalysts of the present invention include use of these metals in combination with Pd and supported on carbon as a catalyst for formic acid fuel cells. Those knowledgeable in the art will appreciate that exemplary catalysts including Pd and any of these metals could be synthesized using methods consistent with the exemplary synthesis of the invention described above with reference to preparation of the exemplary Pd supported on C catalysts.

Figure 5C:
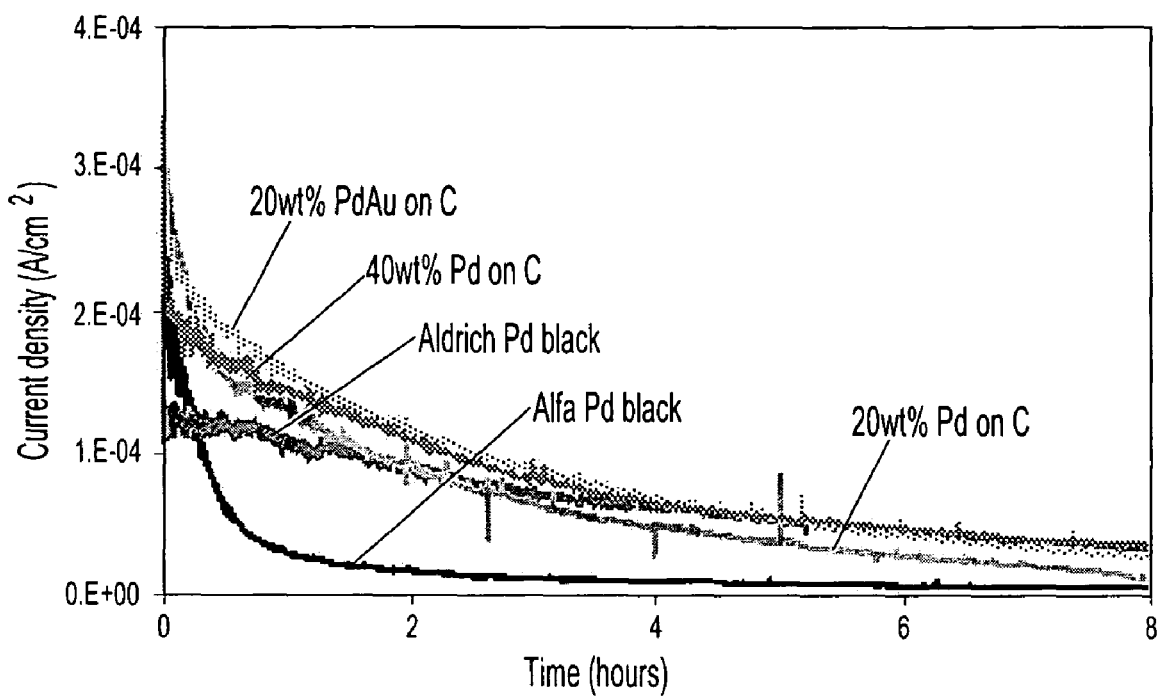
FIG. 5(C) represents the data of FIG. 5(C) normalized on a Pd active surface area basis.

FIG. 5(C) compares the chronoamperometric activity of exemplary Pd based catalysts of the invention at 0.3 V vs. RHE on a total surface area basis. The carbon supported catalysts have the highest initial activity and after 8 hours both the 40 wt % Pd on C and the 20 wt % PdAu on C perform about the same as the Aldrich Pd black while the 20 wt % Pd on carbon has deactivated further. The low surface area Alfa Pd black has the lowest activity.

In general, the exemplary carbon-supported catalysts of the invention perform quite well when used with formic acid fuel cells. Their performance tends to be lower than the high surface area Aldrich Pd black on a total catalyst basis, but when the amount of Pd present is taken into account and results are compared on a per Pd weight basis or active surface area basis, the carbon-supported catalysts tend to do as well or better than the unsupported Aldrich Pd black. This is a surprising and beneficial result. The more efficient use of Pd in the carbon supported catalysts of the invention allow for overall Pd loadings, and thus overall catalyst expense, to be significantly reduced while maintaining sufficiently high catalyst activity.

It is noted that some fuel cell configurations may have a practical limit to the total amount of catalyst (e.g., Pd and C) that can be loaded onto a fuel cell membrane. In many cases this limit is between about 6-8 $mg/cm^2$ of membrane surface area. This practical limit has the result that in some fuel cell configurations the total amount of Pd on the membrane can often be significantly less than for an unsupported catalyst. In fuel cells that are faced with this practical limit, the improved efficiency of exemplary catalyst of the invention may be limited. It is also noted that for a given amount of Pd, the catalyst layer will be thicker for a carbon-supported catalyst of the invention than for un-supported Pd. This has the potential of causing some mass transfer problems at higher current densities. Despite these potential concerns, the higher activity of Pd catalysts of the invention per mass of Pd provides important advantages and benefits, particularly when practiced with formic acid fuel cells.

The 20 wt % PdAu on carbon catalyst has a slightly lower dispersion and active surface area than the 20 wt % Pd on carbon catalyst, yet FIG. D1 demonstrates that the PdAu catalyst has the higher activity when used with formic acid. This is a surprising result. Although the precise reason is not known, it is believed that this may be related to the ability of Au to promote the electro-oxidation of formic acid in some manner. It is believed that this promotion may occur through either electronic modification of the catalyst, a two-body effect or catalytic activity of gold towards poisons/formic acid.

The fourth group of exemplary catalysts of the invention have dispersions of less than about 5%. It will be appreciated that as used herein "dispersion" is intended to broadly refer to the number of palladium atoms available for reaction. For example, dispersion of 5% may mean that only 5% of the catalyst particles are available at the surface and are not otherwise poisoned. It is believed that improvements in dispersion will lead to significant improvement in performance of the catalysts of the invention. Other catalysts of the invention that have higher catalysts dispersions than 5% are believed to provide higher levels of activity than the presently discussed exemplary catalysts. Other catalysts of the invention may have dispersions, by of example and not limitation, of about 10%, at least about 20%, at least about 30%, at least about 50%, or more.

Dispersion may be improved, for example, through improved nanoparticle preparation methods to prevent particle agglomeration and/or reduce nanoparticle size. In synthesis methods of the invention, Pd nanoparticles are prepared by dissolving a metal salt in solution and adding a reducing agent, such as $NaBH_4$, which reduces Pd(2+) to Pd metal nanoparticles. The size of the Pd nanoparticles will depend upon the strength of the reducing agent, the solvents used, the temperature, the stabilizing polymers used, etc. Once the nanoparticles are formed they typically have a surface charge on them. The carbon is prepared such that its surface is acidic. When the pH of the solution is changed to basic, the electrostatic attraction between the carbon surface and the Pd nanoparticles causes the Pd to attach to the carbon. Once they are on the carbon surface, the Pd nanoparticles are retained there.

Accordingly, two steps occur: 1) formation of the nanoparticles 2) attachment of the nanoparticles to the carbon surface. In many of the Fourth Group of exemplary catalysts, Pd nanoparticles are in the 5-10 nm range with a small portion being larger 20-40 nm particles. The 20-40 nm particles tend to lower dispersion. Even though the portion of these larger particles may be relatively small, the mass ratio is more significant since the larger particles are much heavier than the smaller particles. Significant improvements in dispersion can be achieved by preventing even a small number of these larger particles from forming. The dispersion increases quickly as the particle size shrinks. To achieve increased activity, other catalysts of the invention will have substantially all of the Pd nanoparticles of a size less than about 10 nm, and still other catalysts of the invention with substantially all Pd nanoparticles of a size less than about 5 nm. Exemplary catalysts of the invention having Pd particle sizes of about 2 nm will result in a dispersion of about 26%, and exemplary catalysts with a Pd particle size of about 1.2-1.5 nm will achieve dispersions of greater than about 50%-60%. Smaller particle sizes are also believed to improve binding energy of formic acid and hydrogen to the catalyst.

Exemplary catalysts may also benefit through addition of one or more promoters in small quantities (for example, about 1% or less (wt)) that increase catalytic activity. Exemplary promoters include metals and metal compounds (such as metal oxides). Promoters can increase catalytic activity in a variety of ways, including by electronically modifying the catalyst, removing poisons from the catalyst surface, blocking side reactions, improving the dispersion of the catalyst, and the like. An example of a suitable promoter is potassium, which improves dispersion, and ceria, which improves dispersion and modifies the catalyst electronically.

Exemplary formic acid fuel cells using the fourth group of exemplary catalysts of the invention were fabricated to further illustrate some benefits and advantages of the present invention. Membrane electrode assemblies ("MEA"s) with a 5 cm$^2$ active cell area were fabricated using a direct paint technique to apply the catalyst layer. This technique generally involves painting a catalyst ink onto one surface of the membrane and then drying to leave a solid catalyst layer. The catalyst inks were prepared by dispersing the catalyst nanoparticles into appropriate amounts of Millipore water and a 5% recast NAFION® solution (1100 EW, from Solution Technology, Inc.). Anode and cathode catalyst inks were directly painted onto either side of a NAFION® 112 membrane.

For exemplary MEA's, the cathode consisted of unsupported platinum black nanoparticles (27 m$^2$/g, Johnson Matthey) at a standard loading of about 8 mg/cm$^2$. Other loadings are contemplated, with an exemplary range being between about 2 and about 8 mg/cm$^2$. A carbon cloth diffusion layer (E-TeK) was placed on top of both the cathode and anode catalyst layers. Both sides of the cathode carbon cloth were Teflon® coated for water management. A single cell test fixture consisted of machined graphite flow fields with direct liquid feeds and gold plated copper plates to avoid corrosion (Fuel Cell Technologies, Inc.). The anode consisted of either carbon supported or unsupported Pd catalysts. The anode catalyst loading of the Pd/C catalysts were about 6 mg/cm$^2$ including the mass of the carbon supports. The loading of the Pd black catalyst was about 2.4 mg/cm$^2$. For each carbon supported catalyst ink batch, no more than 10 mg of catalyst (total weight of carbon and Pd) was prepared. Before the carbon supported catalyst ink is painted on the polymer electrolyte membrane, two layers of 5 wt % NAFION solution were painted on and dried for one minute. It is believed that these initial layers of NAFION are useful to result in a stable carbon supported Pd catalyst layer.

Figure 6:
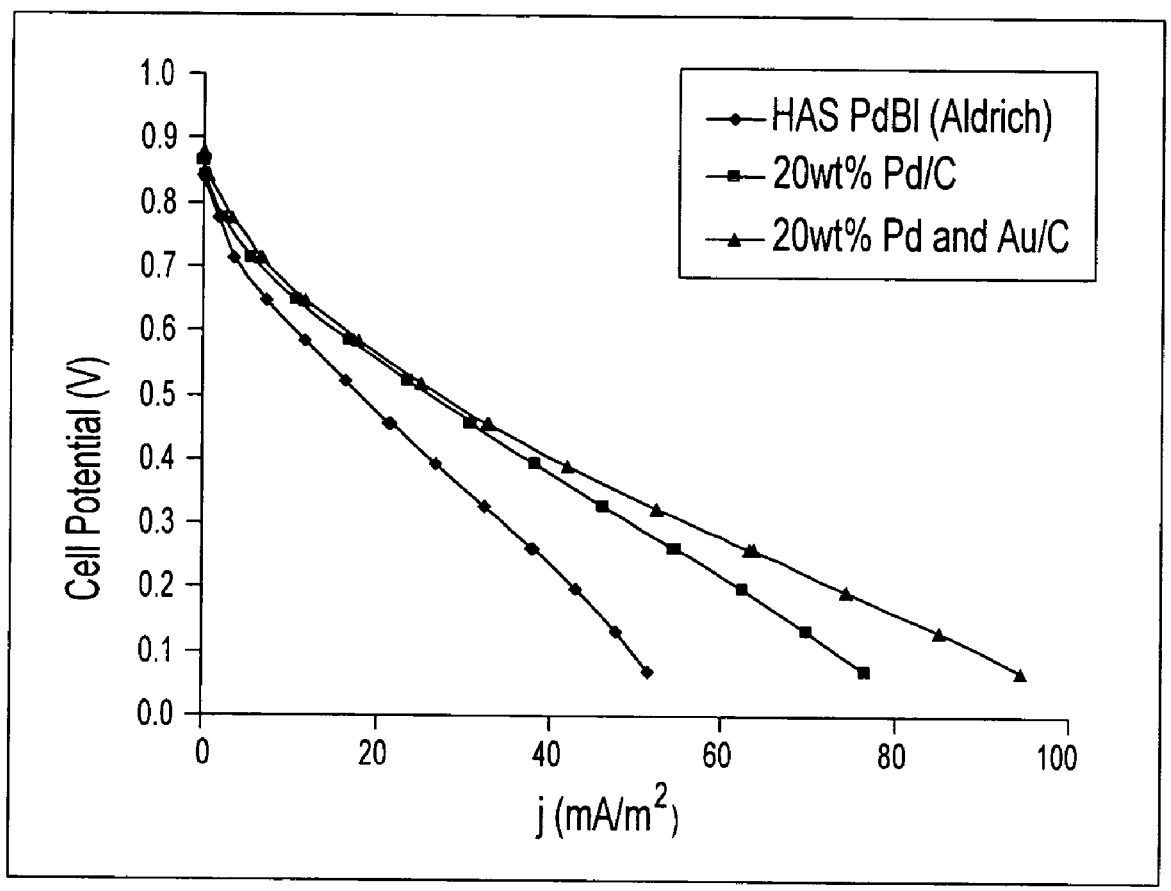
FIG. 6 illustrates experimental results for exemplary fuel cells and fuel cell catalysts of the invention.

FIG. 6 is a voltage current characteristic plot of the thus fabricated exemplary formic acid fuel cell of the invention, run using different catalysts of the invention. All data were generated at 30° C. The currents were normalized by total active surface area. According to FIG. 6, carbon supported Pd catalysts of the invention show higher activity per exposed surface area than the commercial Pd black catalyst. This is a surprising and beneficial result. The PdAu supported on C catalyst showed the highest activity.

Figure 7:
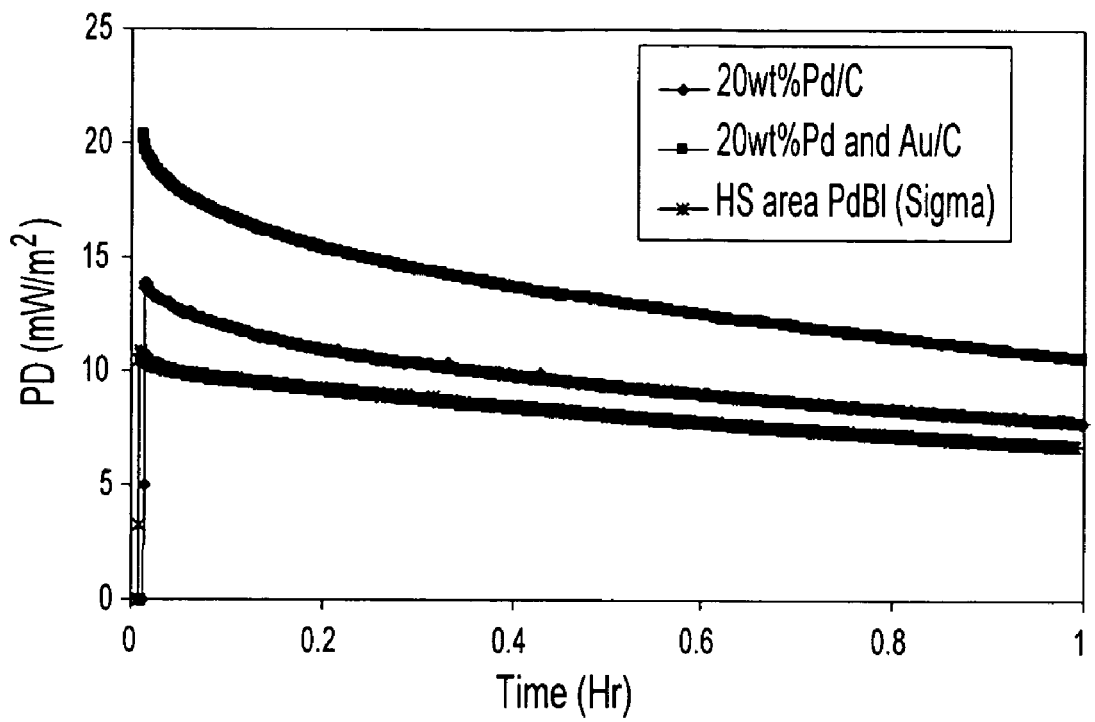
FIG. 7 illustrates experimental results for exemplary fuel cells and fuel cell catalysts of the invention.

FIG. 7 measures the power density of the three exemplary formic acid fuel cells at constant cell voltage (0.39 V), each using a different anode catalyst of the invention. The power data are normalized by total active surface. According to FIG. 7, carbon supported Pd catalysts show higher activity per exposed surface area than the commercial Pd Black catalyst. This is a surprising and beneficial result. The PdAu supported on C catalyst showed the highest activity.

Figure 8:
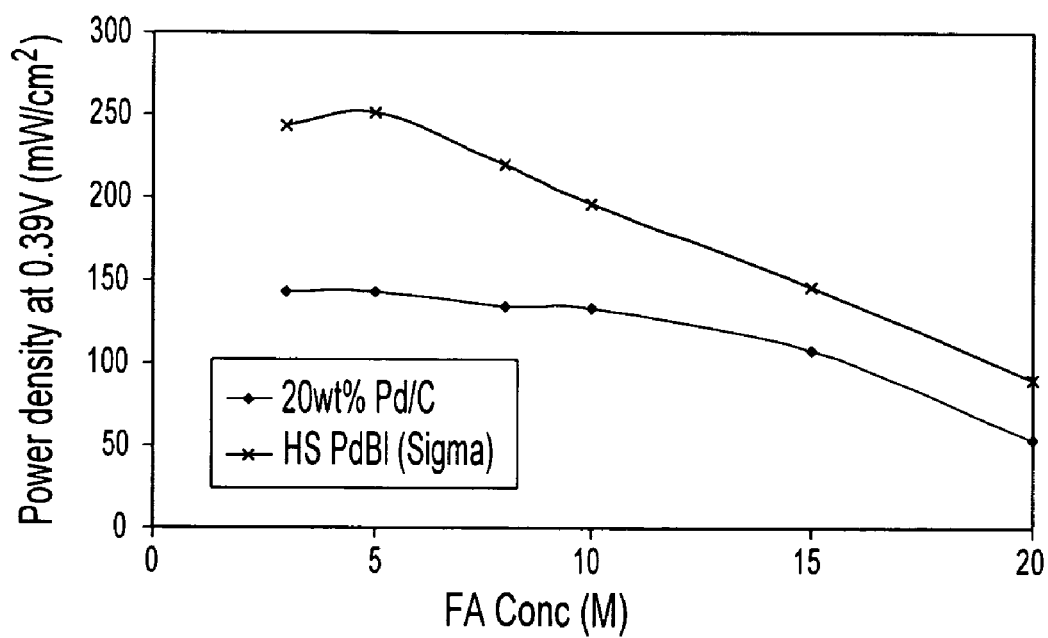
FIG. 8 illustrates experimental results for exemplary fuel cells and fuel cell catalysts of the invention.

FIG. 8 illustrates the effect of formic acid feed concentration on the cell performance with exemplary fuel cells using different catalysts of the invention. According to FIG. 8, a formic acid fuel cell using a Pd black catalyst at 15M formic acid gives the power density of about 146 mW/cm$^2$, which is about 42% performance reduction from its power density at 5M formic acid. FIG. 8 also shows that the formic acid fuel cell with an exemplary 20 wt % Pd supported on carbon catalyst also shows performance degradation as the formic acid feed concentration is increased from 3 to 20 M. The degradation for the Pd supported on carbon catalyst, however, is less severe than that for the unsupported Pd black. According to the data of FIG. 8, the formic acid fuel cell with the carbon supported Pd catalyst at 15M yields a power density of about 107 mW/cm$^2$, which is only about 23% performance reduction from its power density at 5M formic acid. This is a surprising and beneficial result.

Figure 9:
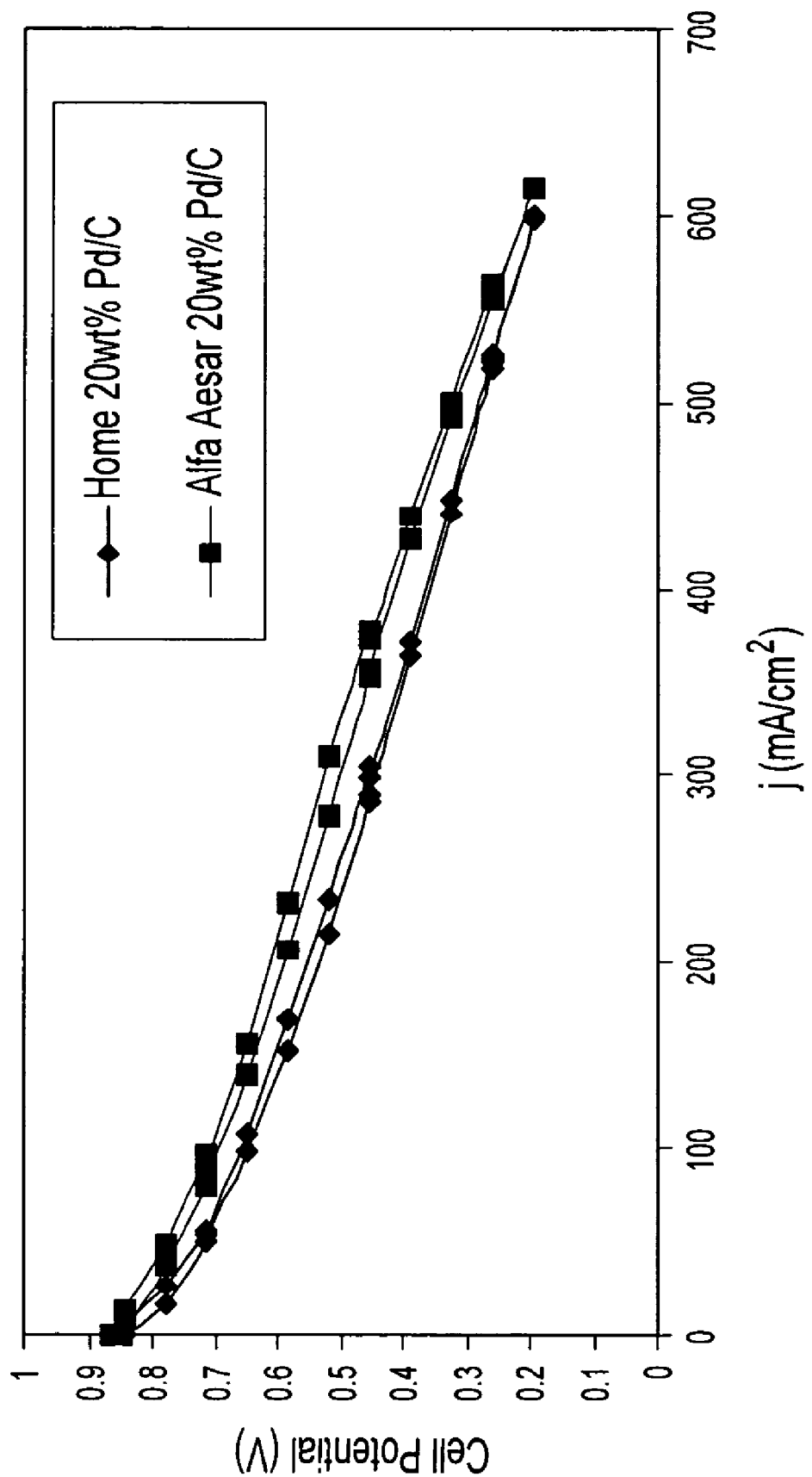
FIG. 9 illustrates experimental results for exemplary fuel cells and fuel cell catalysts of the invention.

FIG. 9 is a formic acid/air fuel cell polarization plot with 5M formic acid feed concentration at 30° C. that further illustrates performance of exemplary catalysts and fuel cells of the invention. Two different anode Pd catalysts were used: 1) 20 wt. % Pd on supported on carbon and made through the synthesis process described above with reference to the fourth group of exemplary catalysts, and 2) commercially available Alfa-Aesar 20 wt. % Pd supported on activated carbon supports. PtBl catalyst was used for the cathode. The anode and cathode catalyst loading were about 1.2 mg Pd/cm$^2$ and about 8 mg/cm$^2$ respectively. The formic acid flow rate to the anode was about 1 ml/min. The dry air was supplied to the cathode at a flow rate of 390 sccm without backpressure. FIG. 9 illustrates that both the commercially available catalyst and the synthesized catalyst show good performance when used with a formic acid fuel cell of the invention. Surprisingly, both catalysts when used at loadings of only about 1.2 mg/cm$^2$ result in current activity levels that are consistent with current activity previously achieved under identical conditions using much higher loadings of about 8 mg/cm$^2$ of unsupported Pd. This is additional evidence that Pd based catalysts of the invention when supported on carbon offer significant benefits and advantages.

It will be appreciated that although four groups of exemplary catalysts of the invention have been illustrated and discussed, these are exemplary only and that other catalysts of the invention are contemplated. Also, although exemplary catalysts of the invention have been discussed with reference to anode catalysts, they are also to be used as cathode catalysts.

Exemplary Fuel Cells and MEA's

Other embodiments of the invention are directed to formic acid fuel cells and membrane electrode assemblies ("MEA") that include catalysts of the invention. It will be appreciated that as discussed above these cells and MEAs provide substantial benefits and advantages due to the substantial performance and low cost of the catalysts of the invention. Several advantages and benefits have been discovered with regard to formic acid fuel cells over other organic fuel cells, including, for example, useful levels of electrical energy generation at temperatures between about ambient and 40° C., low crossover, and a non-toxic and environmentally friendly fuel.

First Exemplary Fuel Cell

Figure 10:
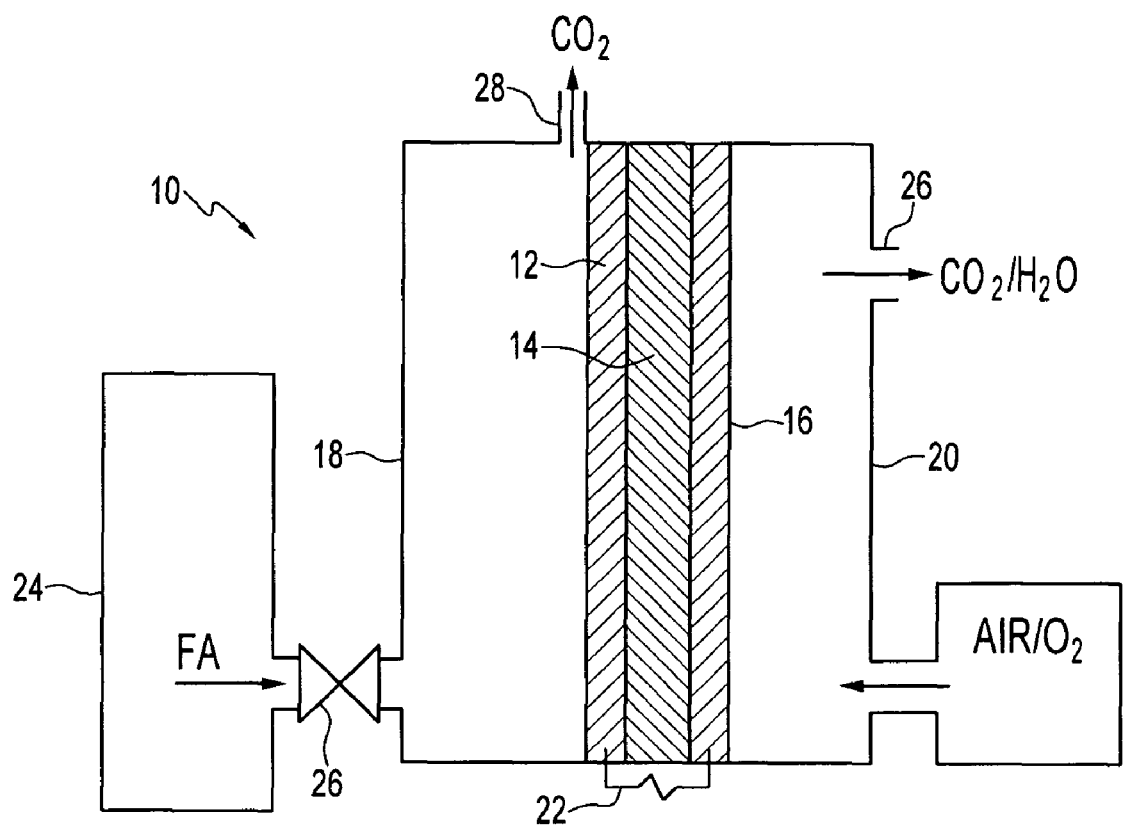
FIG. 10 is a schematic of a first exemplary fuel cell of the invention.

The schematic of FIG. 10 shows an exemplary formic acid fuel cell of the invention generally at 10. The fuel cell 10 includes an anode 12, a solid polymer proton-conducting electrolyte 14, and a gas diffusion cathode 16. The anode 12 is enclosed in an anode enclosure 18, while the cathode 16 is enclosed in a cathode enclosure 20. The cathode enclosure 20 may be open to the surroundings, so that the cathode 16 is exposed to the atmosphere. When an electrical load (not shown) is connected between the anode 12 and cathode 16 via an electrical linkage 22, electro-oxidation of an organic fuel occurs at the anode 12 and electro-reduction of an oxidizer occurs at the cathode 16.

The occurrence of different reactions at the anode 12 and cathode 16 gives rise to a voltage difference between the two electrodes. Electrons generated by electro-oxidation at the anode 12 are conducted through the linkage 22 and are ultimately captured at the cathode 16. Hydrogen ions or protons generated at the anode 12 are transported across the membrane electrolyte 14 to the cathode 16. Thus, a flow of current is sustained by a flow of ions through the cell and electrons through the linkage 22. This current may be exploited to power an electrical device or to charge a battery, for instance.

The anode 12, solid polymer electrolyte 14, and cathode 16 are preferably a single or multi-layer composite structure that may be referred to as a membrane electrode assembly (MEA). Preferably the solid polymer electrolyte 14 is a proton-conducting cation exchange membrane that contains an anionic sulfate, such as the perfluorinated sulfonic acid polymer membrane commercially available under the trademark NAFION from DuPont Chemical Co., Delaware. NAFION is a copolymer of tetrafluoroethylene and perfluorovinylether sulfonic acid. Other membrane materials can also be used, with examples including membranes of modified perfluorinated sulfonic acid polymer, polyhydrocarbon sulfonic acid, membranes containing other acidic ligands and composites of two or more kinds of proton exchange membranes.

In some exemplary fuel cells, the formic acid fuel solution may be provided in a removable container 24 that can be attached to the fuel cell 10 by a valve 26 or other mechanism. The container 24 may be, for example, a disposable or reusable cartridge. It may be at an elevated pressure relative to the enclosure 28 to cause flow of the fuel solution into the enclosure 18. The container 24, for example, may include an elastic or other bladder to urge liquid fuel solution to flow into the enclosure 18. The valve 26 may be closed or opened as desired to cause the fuel solution to circulate into contact with the anode 12. A cartridge configuration such as that shown in FIG. 10 allows for fuel solution to be replaced after it has been depleted. The fuel solution in the cartridge, for example, may be provided at an initial high concentration and gradually deplete as chemical reaction occurs across the MEA.

The valve 26 may be throttled manually or automatically to control flow of fuel solution, which may also control the rate of chemical reaction and generation of energy. It may be desirable, for instance, to isolate the anode 12 from the fuel solution when an electrical device is not in use and there is no need for power generation. The valve 26 may likewise be closed to allow changing of the container 24 after depletion. Additional valves 26 or similar mechanisms may be provided so that, for example, both of the container 24 and the anode enclosure 18 may be sealed. Mixing of concentrated fuel solution with water may occur in the anode enclosure 18, and there may be a (unshown) circulation loop in fluid communication with the anode enclosure to provide water for mixing.

A particular exemplary fuel cell is a formic acid cell having at least about 10% (wt) formic acid fuel solution, while another has at least about 25% formic acid. Still others may have between about 40% and 100% formic acid, and between about 65% and 100%. Other formic acid concentrations are contemplated for practice of the invention, including concentrations below 10%. Fuel solutions having these or other concentrations may be contained in the container 24, and flow into contact with the anode 12. The fuel solution concentration at the anode 12 may be different from that in the container 24 as, for example, it is diluted with a lower concentration fuel solution present in the anode enclosure 18. Further, the concentration may vary with time as the formic acid reacts.

The oxidation reaction that occurs at the anode 12 of the formic acid fuel is:

$$HCOOH \rightarrow 2H^+ + CO_2 + 2e^- \quad \text{(Rctn. 1.)}$$

The $CO_2$ product flows out of the chamber via a gas removal port 28. The gas removal port may be sized, positioned, and otherwise configured to promote a flow path of gas within the anode enclosure 18 that promotes effective stirring of the fuel solution contained therein. The H+ product of Rctn. 1 passes through the polymer electrolyte layer 14 to the cathode 16, and the free electron e⁻ product flows through the electrical linkage 22 to the cathode 16. At the cathode 16 the reduction reaction:

$$O_2 + 2e^- + 2H^+ \rightarrow 2H_2O \quad \text{(Rctn. 2.)}$$

occurs. The oxidant $O_2$ may be obtained from air or from another source. Pumps or other means may be provided to drive the flow of the formic acid fuel solution and of the air/$O_2$. Or, in the case of a passive organic fuel cell, the anode enclosure may remain closed, and gas flow in the anode enclosure may drive circulation of the formic acid solution.

The $H_2O$ product flows out of the cathode enclosure 20 via a removal port 26. In some exemplary fuel cells, the $H_2O$ product may be used to control concentration of the formic acid fuel solution. For example, a relatively high concentration formic acid fuel solution could be provided in the container 24 and be diluted in the anode enclosure with $H_2O$ from the cathode and/or other dilutant(s). An additional reservoir (unshown) connected to the anode enclosure 18 may also be provided that contains $H_2O$ or other dilutant. This may be beneficial in providing highly compact and portable containers 24 as well as for other reasons.

It has been discovered, for instance, that formic acid fuel cells of the invention provide a relatively constant and useful level of electrical energy across a relatively broad fuel concentration range. For example, formic acid fuel cells of the invention may provide a relatively constant and useful level of electrical energy when operating at formic acid fuel concentrations of between about 3 M and about 12 M. Under these circumstances, it may be advantageous to operate at lower concentrations to preserve fuel, to preserve catalyst, to preserve other components from exposure to high concentrations, and for other reasons. Accordingly, formic acid fuel solutions may be provided in relatively high concentration in the container 24 and diluted in the anode. It will be appreciated that formic acid fuel cells of the invention may therefore have some variation of fuel solution concentration over time, and may even have some variation according to location in the anode enclosure 18 and/or the container 24.

Each of the anode 12 and the cathode 16 may include a catalyst layer of the invention that may be supported or unsupported. Exemplary catalysts include those discussed herein above. Pd based catalysts are particularly useful with formic acid fuel cells of the invention for a number of reasons, including cost, low activation energy for formic acid reduction, and overall catalytic activity. Pd catalysts are believed to promote a direct reaction pathway that avoids formation of a CO intermediate, as occurs when using some other catalysts.

Pd based catalysts supported on carbon have shown particularly surprising levels of activity, as discussed herein above. The carbon supported Pd may be combined with a metal M, with Au, V and Mo being three examples, and/or may be supported on a metal M as discussed herein above. Formic acid fuel cells of the invention using catalysts of the invention have been shown to produce relatively high levels of electrical energy while requiring relatively low catalyst loadings. These surprising results offer benefits and advantages including, but not limited to, cost savings.

When using a preferred MEA, the anode 12 and cathode 16 may consist of catalyst layers directly applied to opposite sides of the NAFION membrane. For example, a MEA may be fabricated by directly painting anode and cathode catalyst inks onto opposing surfaces of the membrane 14. Intermediate layers may also be provided, with examples including Au, C or other meshes or screens to promote conduction. The anode ink may contain, for instance, PdAu unsupported or supported on carbon, as well as any other(s) of the catalysts of the invention. When the catalyst ink dries, solid catalyst particles adhere to the membrane 14 to form the anode 12 and the cathode 16. Loadings of between about 0.05-20 mg/cm$^2$ are believed to be useful, with between about 2-8 mg/cm$^2$, and between about between about 4-6 mg/cm$^2$ other useful ranges. Particular loadings may be selected based on the particular catalyst selected, the fuel solution concentration(s), the desired electrical energy output, and other factors.

In addition to support on fine carbon particles, catalysts of the invention may be supported on high surface area carbon sheeting that makes electrical contact with the particles of the electrocatalyst. By way of particular example, the anode 12 may be formed by mixing a catalyst of the invention such as Pd/V with a binder such as NAFION, and spread on carbon backing paper at an exemplary loading of The backing paper can then be attached to a surface of the NAFION membrane 14.

An exemplary cathode electrocatalyst alloy and the carbon fiber backing may additionally contain about 10-50% (by weight) TEFLON to provide hydrophobicity to create a three-phase boundary and to achieve efficient removal of water produced by electro-reduction of oxygen. The cathode catalyst backing is attached to the surface of the NAFION electrolyte membrane 14 opposite of the anode 12.

It will be appreciated that there may be benefits and advantages to providing a plurality of fuels cells 10 of the invention in parallel or series.

Second Exemplary Fuel Cell

Figure 11:
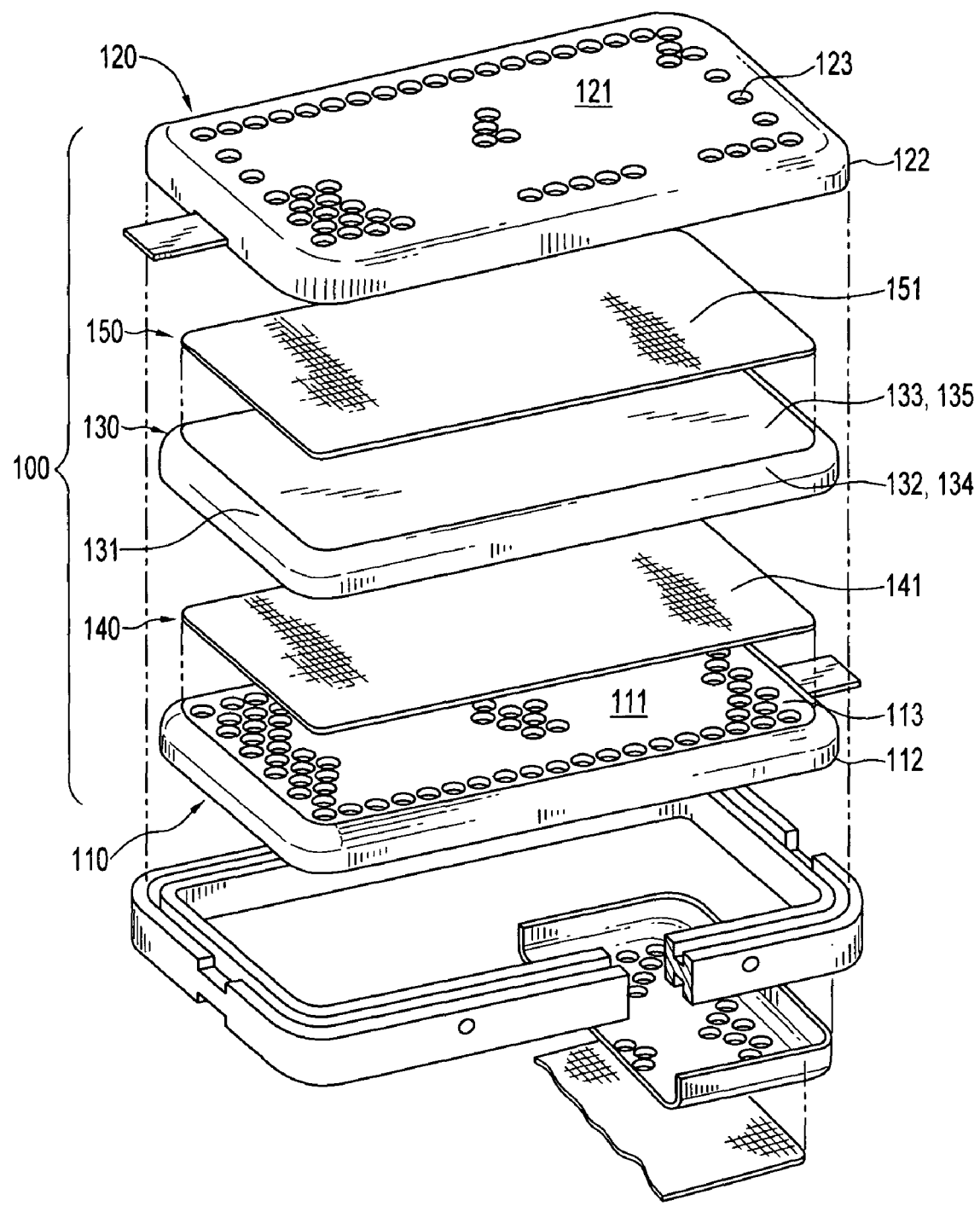
FIG. 11 is a schematic of a second exemplary fuel cell of the invention.

Turning first to FIG. 11, a single direct liquid feed fuel cell 100 includes an anode current collector 110 and a cathode current collector 120. The anode current collector 110 has a major planar portion 111 and an edge 112 that extends substantially perpendicularly from and substantially circumscribes the anode current collector major planar portion 111. The anode current collector major planar portion 111 has openings 113 formed therein that facilitate fluid diffusion through the anode current collector. By way of example, the anode current collector 110 can be formed from gold-plated titanium.

The cathode current collector 120 has a major planar portion 121 and an edge 122 that extends substantially perpendicularly from and substantially circumscribes the cathode current collector major planar portion 121. The cathode current collector major planar portion 121 has openings 123 formed therein that facilitate fluid diffusion through the cathode current collector. By way of example, the cathode current collector 120 can be formed from gold-plated titanium.

As further shown in FIG. 11, an MEA 130 is interposed between the anode current collector 110 and the cathode current collector 120. The MEA 130 includes a membrane electrolyte 131 with two opposing facing major planar surfaces 132, 133. One of the MEA major planar surfaces 132 faces the anode current collector 110, and the other major planar surface 133 faces the cathode current collector 120. On the MEA major planar surface 132, a first electrocatalyst layer 134 is disposed. On the MEA major planar surface 135, a second electrocatalyst layer 135 is disposed. By way of particular example, the membrane electrolyte 131 can be formed from a perfluorosulfonic acid membrane, such as NAFION.

An anode fluid diffusion layer 140 is interposed between the anode current collector 110 and the MEA 130. The anode fluid diffusion layer 140 includes an electrically conductive material 141. By way of example, this electrically conductive material 141 can be formed from stainless steel mesh, gold-plated stainless steel mesh, solid gold mesh, gold plated titanium mesh, titanium mesh, niobium mesh, gold plated niobium mesh, platinum plated niobium mesh, palladium plated niobium mesh, carbon cloth, carbon paper, Teflon coated carbon cloth, Teflon coated carbon paper, gold plated expanded niobium foil, platinum plated niobium foil, or palladium plated niobium foil.

A cathode fluid diffusion layer 150 is interposed between the cathode current collector 120 and the MEA 130. The cathode fluid diffusion layer 150 includes an electrically conductive material 151. By way of example, this electrically conductive material 151 can be formed from stainless steel mesh, gold-plated stainless steel mesh, solid gold mesh, gold plated titanium mesh, titanium mesh, niobium mesh, gold plated niobium mesh, platinum plated niobium mesh, palladium plated niobium mesh, carbon cloth, carbon paper, Teflon coated carbon cloth, Teflon coated carbon paper, gold plated expanded niobium foil, platinum plated niobium foil, or palladium plated niobium foil.

The edge of the cathode current collector 122 can be press fit onto the edge of the anode current collector 112 to form a partial seal. In order to maintain electrical isolation between the anode and cathode, it is necessary that a layer of electrically insulative material 310 (FIG. 15) be placed between the anode current collector and the cathode collector. In the context of this invention, the term electrically insulative material is understood to mean a material that is a better insulator for electrons than for protons. Electrically insulative materials include all classes of traditional insulators such as rubber, glass, air, and silicone. Electrically insulative materials also include ion exchange membranes that block the flow of electrons while allowing the flow of H$^+$ ions. NAFION is an example of an ion exchange membrane that is an electrically insulative material. The cathode-anode partial seal assists in containing fluids disposed between the anode current collector 110 and the cathode current collector 120. The cathode-anode partial seal may be further enhanced with a sealant 312, 314 (FIG. 15).

In another embodiment, the MEA 130 has an edge 136 that circumscribes either of the MEA oppositely facing major planar surfaces 132, 133. The cathode current collector edge 122 can be press fit with the MEA edge 136 to form a partial seal. The cathode-MEA partial seal may be further enhanced with a sealant 312. The cathode-MEA partial seal assists in containing fluids disposed between the cathode current collector 120 and the MEA 130. During the press-fitting, the presence of the uncured sealant 312 helps lubricate the MEA edge 136 to prevent tearing.

The MEA edge 136 may further be press fit with the anode current collector edge 112 to form a partial seal. The anode-MEA partial seal may be further enhanced with a sealant 314. The anode-MEA partial seal assists in containing fluids disposed between the anode current collector 110 and the MEA 130. During the press-fitting, the presence of the uncured sealant 314 helps lubricate the MEA edge 136 to prevent tearing.

Figure 13:
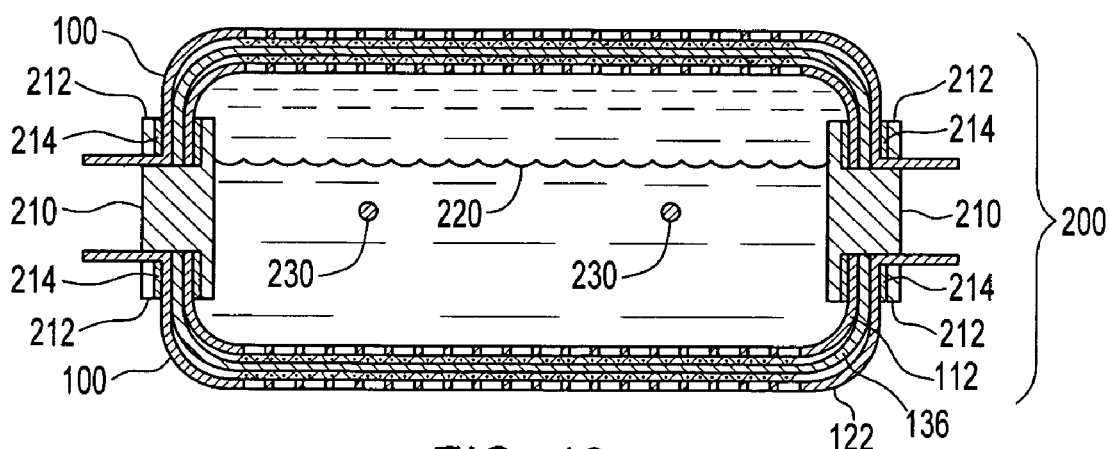
FIG. 13 is a schematic of a portion of the second exemplary fuel cell of the invention.
Figure 15:
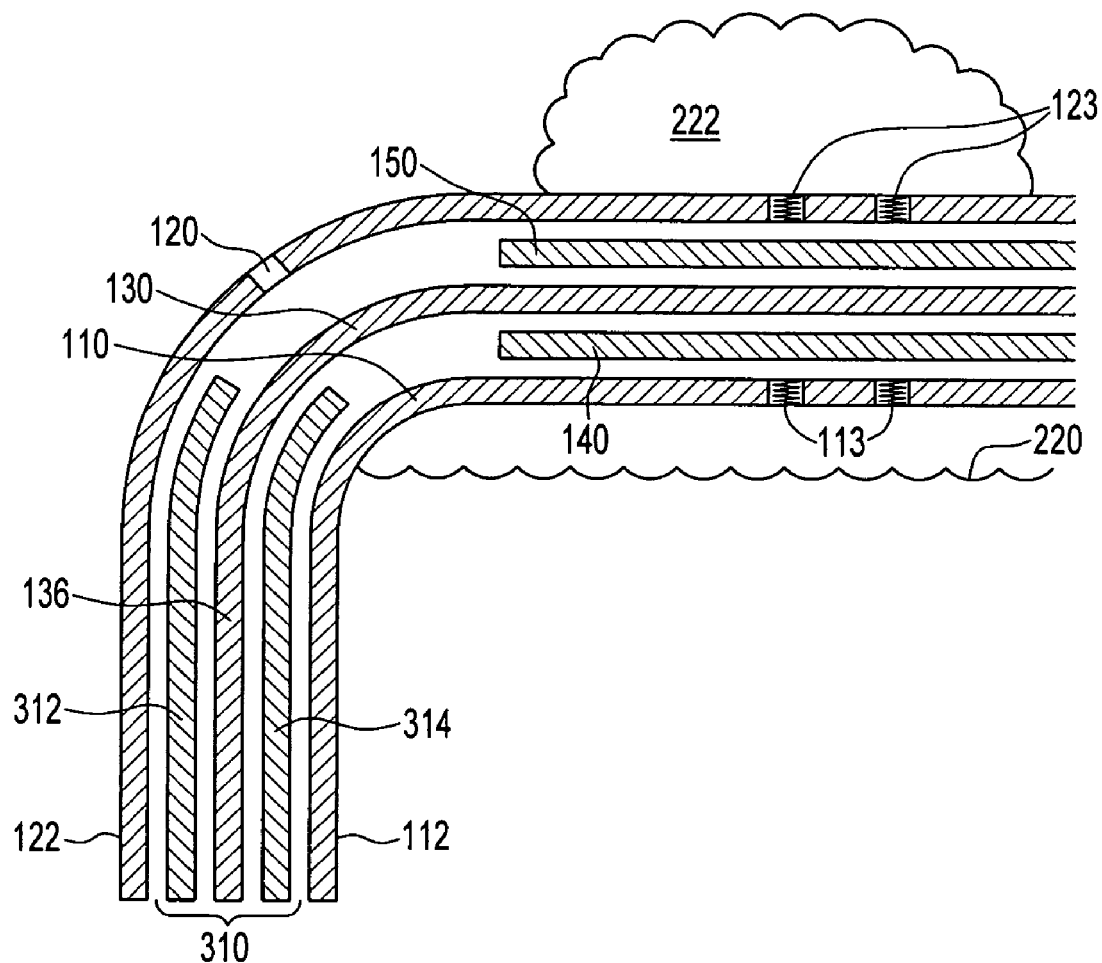

Referring now to FIGS. 13 and 15 in addition to FIG. 11, in a preferred embodiment a liquid fuel stream 220 is directed through the openings 113 in the anode current collector major planar portion 111 and towards the anode fluid diffusion layer 140. A fluid oxidant 221 is directed through the openings 123 of the cathode current collector major planar portion 121, and towards the cathode fluid diffusion layer 150. In the exemplary fuel cell, the liquid fuel stream 220 includes formic acid, and the fluid oxidant 221 includes oxygen-containing air. Because formic acid displays corrosive properties, any sealants 312, 314 should be appropriately resistant to formic acid. One suitable sealant that did not fail through extended use with formic acid is silicone sealant, such as PDMS Silicone Elastomer available from Dow Corning®.

Figure 12:
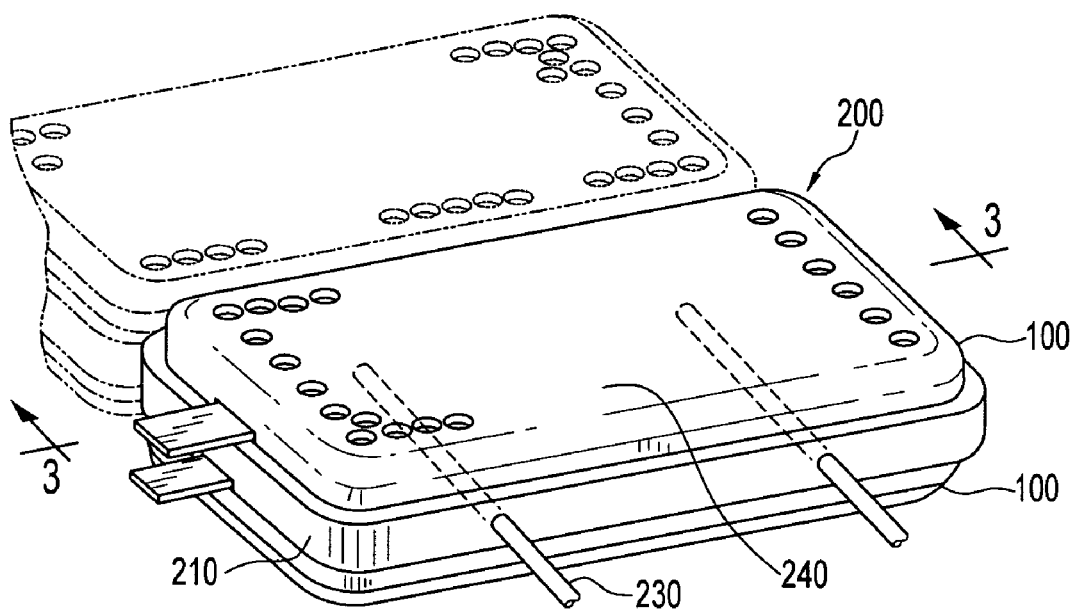
FIG. 12 is a schematic of a portion of the second exemplary fuel cell of the invention.

Turning now to FIGS. 12 and 13, a direct liquid feed fuel cell array 200 includes at least two direct liquid feed fuel cells 100, as described above, and a frame 210. As an example, the frame 210 may be formed from a rigid electrical insulator, such as a polycarbonate material, Kel-F®, or Teflon®.

The frame 210 has at least two edge portions 212, and each edge portion 212 contains a channel 214. Each channel 214 can accommodate an anode current collector edge 112 and a cathode current collector edge 122. In another embodiment, each channel can further accommodate a membrane electrolyte edge 136.

The array 200 is constructed such that the frame 210 and the at least two direct liquid feed fuel cells 100 create a partially enclosed volume. Fluids disposed inside this volume 240 are partially contained by the frame 210 and the at least two direct liquid feed fuel cells 100. In one embodiment, one of the fluids disposed inside the volume 240 of the array 200 is an organic liquid fuel, such as formic acid. In a further embodiment, in order to further contain fluids disposed inside the volume of the array 200, an adhesive may be used to bond the fuel cell assembly edge portions 112, 122, or 136 with the fuel cell array frame channels 214. As discussed above, in life tests, silicone sealant performs well when used with formic acid. In another embodiment, the frame has one or more passages 230 that transverse the main body of the frame 210. The passages 230 allow for convenient refueling of the array 200, and for venting of the anodic oxidation reaction.

Figure 14:
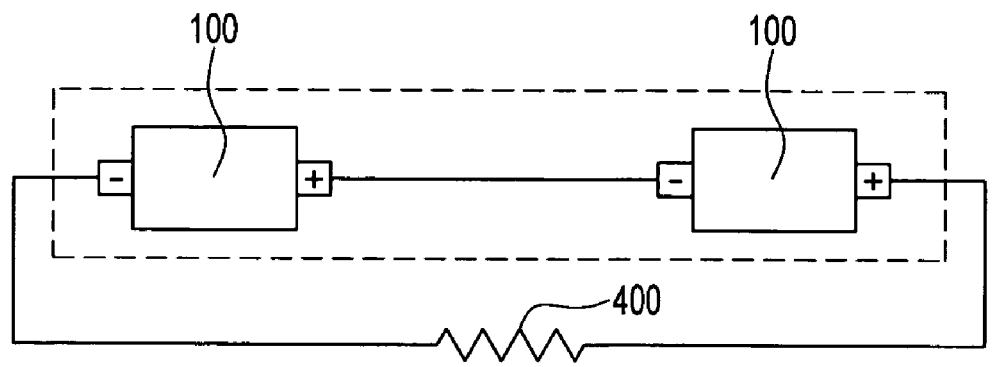
FIG. 14 is a schematic of an electrical circuit employing exemplary fuel cells of the invention; and, FIG. 15 is a schematic of a portion of the second exemplary fuel cell of the invention.

Turning to FIG. 14, an array 200 consisting of two fuel cells 100 is shown in an electrical circuit. The fuel cells 100 are connected in series and a resistive load 400 is placed across the series of fuel cells. In this configuration, electrical power can be generated as current flows through the resistive load 400. It will be appreciated that other numbers of fuel cells 100 of the invention may be provided in series or parallel as may be desirable to provide a desired level of electrical energy or for other reasons.

While particular elements, embodiments and applications of the present invention have been shown and described, it will be understood that the invention is not limited thereto since modifications may be made by those skilled in the art without departing from the scope of the present disclosure, particularly in light of the foregoing teachings.

The invention claimed is:

1. A formic acid fuel cell comprising:
   an anode and a cathode, and an electrolyte sandwiched between said anode and said cathode;
   an oxidizer in communication with said cathode;
   a formic acid fuel solution in communication with said anode and containing at least about 25% (wt) formic acid; and,
   an anode catalyst comprising Pd.

2. A formic acid fuel cell as defined by claim 1 wherein said anode catalyst further includes a metal chosen from the group of metals Ti, Zr, Hf, V, Nb, Ta, Cr, Mo, W, and Au.

3. A fuel cell as defined by claim 2 wherein the metal is Au.

4. A fuel cell as defined by claim 2 wherein the metal is V.

5. A fuel cell as defined by claim 2 wherein the metal is Mo.

6. A fuel cell as defined by claim 1 wherein said anode catalyst comprising Pd is supported on carbon.

7. A fuel cell as defined by claim 1 wherein said Pd comprises nanoparticles.

8. A fuel cell as defined by claim 7 wherein said Pd nanoparticles are no greater than about 10 nm.

9. A fuel cell as defined by claim 7 wherein said Pd nanoparticles are no greater than about 5 nm.

10. A fuel cell as defined by claim 6 wherein said anode catalyst is prepared by a metal chloride reduction process.

11. A fuel cell as defined by claim 6 wherein said Pd comprises at least about 5% (wt) of said catalyst based on the total weight of said catalyst.

12. A fuel cell as defined by claim 6 wherein said Pd comprises at least about 10% (wt) of said catalyst based on the total weight of said catalyst.

13. A fuel cell as defined by claim 6 wherein said Pd comprises at least about 20% (wt) of said catalyst based on the total weight of said catalyst.

14. A fuel cell as defined by claim 6 wherein said anode catalyst has a Pd dispersion of at least about 20%.

15. A fuel cell as defined by claim 6 wherein said anode catalyst has a Pd dispersion of at least about 50%.

16. A fuel cell as defined by claim 1 wherein said anode catalyst comprises Pd and Au supported on carbon.

17. A fuel cell as defined by claim 1 wherein said formic acid fuel solution contains at least about 40% (wt) formic acid.

18. A fuel cell as defined by claim 1 and further including a replaceable cartridge containing said formic acid fuel solution, said cartridge configured to be removably attached to the fuel cell whereby said formic acid fuel solution may communicate with said anode.

19. A formic acid fuel cell comprising:
- an anode and a cathode, an electrolyte sandwiched between said anode and said cathode;
- an oxidizer in communication with said cathode;
- a formic acid fuel solution having a concentration of at least about 25% formic acid in communication with said anode; and,
- an anode catalyst comprising Pd nanoparticles supported on carbon.

20. A formic acid fuel cell membrane electrode assembly comprising:
- a proton-conducting membrane having opposing first and second surfaces;
- a cathode catalyst on said second membrane surface;
- an anode catalyst including Pd on said first surface; and
- a formic acid fuel solution of at least about 25% (wt) in communication with said anode catalyst layer.

21. A formic acid fuel cell membrane electrode assembly as defined by claim 20, wherein said membrane comprises a solid polymer proton exchange membrane.

22. A formic acid fuel cell membrane electrode assembly as defined by claim 20 wherein said membrane comprises a perfluorsulfonic acid ionomer.

23. A formic acid fuel cell membrane electrode assembly as defined by claim 20 wherein said anode catalyst further includes a metal chosen from the group of metals Ti, Zr, Hf, V, Nb, Ta, Cr, Mo, W, and Au.

24. A formic acid fuel cell membrane electrode assembly as defined by claim 23 wherein said anode catalyst is Au.

25. A formic acid fuel cell fuel cell membrane electrode assembly as defined by claim 20 wherein said anode catalyst comprising Pd is supported on carbon.

26. A formic acid fuel cell fuel cell membrane electrode assembly as defined by claim 20 wherein said Pd comprises nanoparticles.

27. A formic acid fuel cell fuel cell membrane electrode assembly as defined by claim 26 wherein said Pd nanoparticles are no greater than about 10 nm.

28. A formic acid fuel cell fuel cell membrane electrode assembly as defined by claim 20 wherein said Pd comprises at least about 10% (wt) of said catalyst based on the total weight of said catalyst.

29. A formic acid fuel cell fuel cell membrane electrode assembly as defined by claim 20 wherein said anode catalyst comprises Pd and Au supported on carbon.

30. A formic acid fuel cell membrane electrode assembly as defined by claim 20 and further including an electrically conductive material overlying said anode catalyst.

31. A formic acid fuel cell membrane electrode assembly as defined by claim 30 wherein said electrically conductive material comprises a metal mesh.

32. A fuel cell as defined by claim 7 wherein said Pd nanoparticles have a surface area of at least about 25 $m^2/g$.

33. A formic acid fuel cell membrane electrode assembly as defined by claim 26 wherein said Pd nanoparticles have a surface area of at least about 25 $m^2/g$.

34. An electro-oxidation catalyst for a direct organic acid fuel cell comprising Pd nanoparticles.

35. The electro-oxidation catalyst of claim 34, wherein the Pd nanoparticles are no greater than about 10 nm.

36. The electro-oxidation catalyst of claim 34, wherein the Pd nanoparticles are no greater than about 5 nm.

37. The electro-oxidation catalyst of claim 34, wherein the Pd nanoparticles have a surface area of at least about 25 $m^2/g$.

38. The electro-oxidation catalyst of claim 34, wherein the Pd nanoparticles are supported on carbon.

39. A formic acid fuel cell fuel cell membrane electrode assembly as defined by claim 20 wherein said formic acid concentration is at least about 40% (wt %).

* * * * *

UNITED STATES PATENT AND TRADEMARK OFFICE
CERTIFICATE OF CORRECTION

PATENT NO. : 7,740,974 B2  Page 1 of 1
APPLICATION NO. : 10/578055
DATED : June 22, 2010
INVENTOR(S) : Masel et al.

It is certified that error appears in the above-identified patent and that said Letters Patent is hereby corrected as shown below:

In the Specification:

Col. 2, line 44

Please delete "data of FIG. 5(C)" and insert --data of FIG. 5(A)-- therefor.

Signed and Sealed this

Twelfth Day of October, 2010

David J. Kappos
*Director of the United States Patent and Trademark Office*